US008926907B2

(12) United States Patent
Albin

(10) Patent No.: US 8,926,907 B2
(45) Date of Patent: Jan. 6, 2015

(54) SYSTEM AND PROCESS FOR INJECTING CATALYST AND/OR ADDITIVES INTO A FLUIDIZED CATALYTIC CRACKING UNIT

(75) Inventor: Lenny Lee Albin, Sulphur, LA (US)

(73) Assignee: W. R. Grace & Co.-Conn, Columbia, MD (US)

( * ) Notice: Subject to any disclaimer, the term of this patent is extended or adjusted under 35 U.S.C. 154(b) by 83 days.

(21) Appl. No.: 13/049,440

(22) Filed: Mar. 16, 2011

(65) Prior Publication Data

US 2011/0203970 A1  Aug. 25, 2011

Related U.S. Application Data

(60) Continuation-in-part of application No. 12/948,167, filed on Nov. 17, 2010, which is a division of application No. 10/593,499, filed as application No. PCT/US2005/009642 on Mar. 23, 2005, now Pat. No. 8,012,422, which is a continuation-in-part of application No. 10/806,563, filed on Mar. 23, 2004, now Pat. No. 7,846,399.

(51) Int. Cl.
| B01J 4/00 | (2006.01) |
|---|---|
| B01J 8/24 | (2006.01) |
| B65G 53/28 | (2006.01) |
| B01J 8/00 | (2006.01) |
| B01J 8/06 | (2006.01) |
| B01J 8/18 | (2006.01) |
| C10G 11/18 | (2006.01) |

(52) U.S. Cl.
CPC .............. *B01J 8/0015* (2013.01); *B01J 8/0025* (2013.01); *B01J 8/003* (2013.01); *B01J 8/0035* (2013.01); *B01J 8/004* (2013.01); *B01J 8/006* (2013.01); *B01J 8/06* (2013.01); *B01J 8/18* (2013.01); *B01J 8/24* (2013.01); *C10G 11/18* (2013.01); *C10G 11/187* (2013.01); *B65G 53/28* (2013.01); *B01J 2208/00548* (2013.01); *B01J 2208/00752* (2013.01); *B01J 2208/00761* (2013.01); *B01J 2208/00769* (2013.01)
USPC ........... 422/110; 422/111; 422/139; 422/145; 422/219; 406/122; 406/124; 406/126; 406/145; 406/146

(58) Field of Classification Search
None
See application file for complete search history.

(56) References Cited

U.S. PATENT DOCUMENTS

| 2,032,367 A | * | 3/1936 | Kennedy et al. ................ 406/25 |
|---|---|---|---|
| 2,992,858 A | | 7/1961 | Pendleton ....................... 302/17 |
| 3,226,338 A | * | 12/1965 | Andrzej Romanski et al. ............................ 502/218 |

(Continued)

FOREIGN PATENT DOCUMENTS

| EP | 0476249 | 3/1992 | ............. B01F 13/02 |
|---|---|---|---|
| EP | 0408606 | 9/1993 | |

(Continued)

OTHER PUBLICATIONS

Clemtex CIS-1440-LI-280, "Automatic Catalyst Injection System", Operation and Parts Manual, Clemtex® Sandblasting and Painting Equipment and Supplies, CLEM-00251-00277, 26 pages.

(Continued)

*Primary Examiner* — Jennifer A Leung
(74) *Attorney, Agent, or Firm* — Charles A. Cross

(57) ABSTRACT

Systems for loading catalyst and/or additives into a fluidized catalytic cracking unit are disclosed. Methods of making and using the systems are also disclosed.

18 Claims, 13 Drawing Sheets

(56) References Cited

U.S. PATENT DOCUMENTS

| | | | |
|---|---|---|---|
| 3,372,958 A | 3/1968 | Black | 302/53 |
| 3,591,525 A | 7/1971 | Markham et al. | 252/440 |
| 3,632,173 A * | 1/1972 | Reuter | 406/15 |
| 3,790,036 A * | 2/1974 | Miller | 406/128 |
| 3,850,582 A | 11/1974 | Luckenbach | 23/288 |
| 3,937,521 A * | 2/1976 | Reuter | 406/25 |
| 3,989,308 A | 11/1976 | Zimmermann et al. | 302/3 |
| 4,005,908 A | 2/1977 | Freeman | 302/3 |
| 4,018,671 A | 4/1977 | Andon et al. | 208/152 |
| 4,054,784 A | 10/1977 | Ricciardi et al. | 364/479 |
| 4,165,133 A | 8/1979 | Johnson | 406/109 |
| 4,191,223 A | 3/1980 | Bourgeois | 141/18 |
| 4,269,548 A | 5/1981 | Bennigsen-Mackiewicz et al. | 406/25 |
| 4,301,880 A | 11/1981 | Krambrock et al. | 177/189 |
| 4,345,858 A | 8/1982 | Barlow | 406/34 |
| 4,379,663 A | 4/1983 | Allison | 406/23 |
| 4,557,637 A | 12/1985 | Barclay et al. | 406/153 |
| RE32,101 E | 4/1986 | Ricciardi et al. | 222/56 |
| 4,687,381 A | 8/1987 | Dumain et al. | 406/52 |
| 4,695,205 A | 9/1987 | Levine | 406/38 |
| 4,701,080 A | 10/1987 | van Aalst | 406/109 |
| 4,854,353 A | 8/1989 | Russell | 141/74 |
| 4,880,142 A | 11/1989 | Higuchi et al. | 222/56 |
| 4,882,784 A | 11/1989 | Tump | 364/567 |
| 4,883,390 A | 11/1989 | Reintjes et al. | 406/24 |
| 4,927,523 A | 5/1990 | Donnelly | 208/120 |
| 4,927,526 A | 5/1990 | Anderson et al. | 208/152 |
| 4,994,173 A | 2/1991 | Tai-Sheng et al. | 208/152 |
| 5,081,600 A | 1/1992 | Tump | 364/571.08 |
| 5,240,683 A | 8/1993 | Maurel et al. | 422/135 |
| 5,260,880 A | 11/1993 | Tump | 364/479 |
| 5,335,185 A | 8/1994 | Pitts et al. | 364/510 |
| 5,357,306 A | 10/1994 | Skye et al. | 354/324 |
| 5,389,236 A | 2/1995 | Bartholic et al. | 208/152 |
| 5,556,238 A * | 9/1996 | Chinh | 406/136 |
| 5,890,868 A | 4/1999 | Comardo | 414/587 |
| 6,132,157 A | 10/2000 | Comardo | 414/160 |
| 6,358,401 B1 | 3/2002 | Evans | 208/152 |
| 6,474,372 B2 | 11/2002 | Sanderson et al. | 141/83 |
| 6,508,930 B1 | 1/2003 | Evans et al. | 208/113 |
| 6,527,141 B2 | 3/2003 | Sanders | 222/1 |
| 6,811,301 B2 | 11/2004 | Packard | 366/141 |
| 6,859,759 B2 | 2/2005 | Evans | 702/188 |
| 6,878,656 B2 | 4/2005 | Bartholic | 502/64 |
| 6,974,559 B2 | 12/2005 | Evans | 422/110 |
| 6,994,497 B1 * | 2/2006 | Eriksson et al. | 406/124 |
| 2001/0041117 A1 | 11/2001 | Comardo | 414/160 |
| 2002/0066746 A1 | 6/2002 | Sanders | 222/1 |
| 2003/0097243 A1 | 5/2003 | Mays et al. | 703/2 |
| 2003/0111131 A1 | 6/2003 | Zhu et al. | 141/18 |
| 2004/0099572 A1 | 5/2004 | Evans | 208/113 |
| 2004/0102929 A1 | 5/2004 | Evans | 702/188 |
| 2004/0117158 A1 | 6/2004 | Evans | 702/188 |
| 2004/0166032 A1 | 8/2004 | Evans | 422/145 |
| 2004/0260487 A1 | 12/2004 | Evans | 702/50 |
| 2005/0103684 A1 | 5/2005 | Evan | 208/113 |
| 2005/0106079 A1 | 5/2005 | Evans | 422/130 |

FOREIGN PATENT DOCUMENTS

| | | |
|---|---|---|
| JP | 59127642 A | 7/1984 |
| JP | 01214519 A | 8/1989 |
| WO | 89/07487 | 8/1989 |
| WO | 00/48723 | 8/2000 |

OTHER PUBLICATIONS

Clemtex SBC-4872-V Automatic Catalyst Injection System Operation and Parts manual, WRG-007768-007788, 21 pages.

PLC-5 Family Programmable Controllers, Processor Manual, Allen Bradley, A Rockwell International Company, Chapter 1 thru Chapter 10. Apr. 1996.

IQ Plus 180, Digital Weight Indicator, Operating Manual, Rice Lake Weighing Systems, Feb. 15, 1993, WRG-052132-052248, 1-1, 14-13.

Bulletin 1745 SLC™ Programmable Controllers, Allen Bradley, A Rockwell International Company, Nov. 1987, Publication 1745-800A, Chapter 1-22.

\* cited by examiner

SYSTEM AND PROCESS FOR INJECTING CATALYST AND/OR ADDITIVES INTO A FLUIDIZED CATALYTIC CRACKING UNIT

CROSS-REFERENCE TO RELATED APPLICATIONS

The present application is a continuation in part of U.S. application Ser. No. 12/948,167, filed Nov. 17, 2010 which is a divisional of U.S. application Ser. No. 10/593,499, filed on Sep. 20, 2006, which is the national phase application of International Patent Application Serial No. PCT/US2005/009642, filed on Mar. 23, 2005, which is a continuation in part of U.S. application Ser. No. 10/806,563, filed Mar. 23, 2004, the contents of all of which is incorporated by reference herein in its entirety.

FIELD OF THE INVENTION

The present invention relates to equipment used in fluidized catalytic cracking (FCC) operations and, more particularly, to systems and processes for injecting catalyst and/or additives into equipment units employed to conduct FCC operations.

BACKGROUND OF THE INVENTION

FCC units commonly include a circulating inventory of bulk catalyst. The bulk catalyst is typically used to perform a primary function, such as producing naptha from petroleum feedstock, the naptha being further processed into gasoline. Additives, which are often in the same fluidizable and particulated form as the catalyst, are often introduced into the circulating inventory of bulk catalyst to perform a secondary function such as reducing certain types of emissions, e.g., SOx or NOx, produced by the FCC unit. These emissions are produced in the catalyst regenerator of the FCC unit where coke deposits from the cracked petroleum are burned off and the regenerated catalyst returned to the circulating catalyst inventory. These additives are usually introduced into the regenerator using an injection device commonly referred to as a "loader." Loaders are also used to add catalyst to the bulk inventory as additional catalyst becomes necessary due to factors such as attrition and deactivation.

Loaders used for catalyst and/or additive injection typically comprise a transfer pot, and a storage hopper or silo located above or proximate the transfer pot. The catalyst and/or additive is usually transferred to the storage hopper from a storage bin using a suitable technique such as vacuum transfer. During operation of the loader, a predetermined amount of catalyst and/or additive can be metered to the transfer pot from the storage hopper. The transfer pot can subsequently be pressurized, and the catalyst and/or additive can be injected into the regenerator in response to the pressure within the transfer pot. This process is usually repeated on a cyclical basis.

The amount of catalyst metered to the transfer pot and injected during each cycle is usually small in comparison to the overall volume of the storage hopper. In other words, a relatively large volume of catalyst and/or additive is typically stored in the hopper so that relatively small doses of the catalyst and/or additive can be metered to the transfer pot during each cycle. A typical storage hopper is relatively large due to the need to accommodate a large amount of additive or catalyst therein. For example, a typical storage hopper can have a diameter of five feet or more, and height of fifteen feet or more.

The relatively large size of conventional storage hoppers can limit the number of suitable locations in which the loader can be installed. This characteristic can be particularly disadvantageous at a refinery, where space can be and often is limited. The need for a relatively large area to accommodate the loader (and in particular the storage hopper) can thus necessitate placing the loader in a less than optimal location.

Moreover, the loader can only be used to inject one type of catalyst and/or additive at a time, due to the need for a dedicated storage hopper for each type of catalyst and/or additive. In other words, the transfer pot can only inject the catalyst and/or additive stored in its associated hopper, until the catalyst and/or additive is replaced with another type of catalyst and/or additive. Hence, loading different types of catalysts and/or additives on simultaneous or near-simultaneous (back to back) basis can only be accomplished using multiple loaders. Each additional loader requires additional outlays of time, labor, and money to purchase, install, operate, and maintain. Moreover, each loader consumes potentially valuable space within the refinery.

The storage hopper may be pressurized in some applications to facilitate transfer of the catalyst and/or additive to the transfer pot. The pressurized air within the hopper can adversely affect the measurements that provide an indication of how much catalyst and/or additive has been added to the transfer pot. Also, the catalyst and/or additive may be exposed to pressurized air from the refinery (commonly referred to as "plant air") while it is being transferred to, or stored in the hopper. Plant air often contains moisture or other contaminates that can adversely affect the catalyst and/or additive.

SUMMARY OF THE INVENTION

A preferred embodiment of a system for injecting catalyst and/or additives into a fluidized catalytic cracking unit comprises a dust collector in fluid communication with a storage bin holding one of the catalyst and/or additives, and a vacuum producer in fluid communication with the dust collector so that the vacuum producer generates a vacuum within the dust collector that draws the one of the catalyst and/or additives into the dust collector.

The system also comprises a transfer pot for receiving the one of the catalyst and/or additives from the dust collector. The transfer pot is in fluid communication with the fluidized catalytic cracking unit and a source of pressurized air so that the one of the catalyst and/or additives is transferred to the fluidized catalytic cracking unit in response to a pressure differential between the transfer pot and the fluidized catalytic cracking unit.

A preferred embodiment of a system for loading catalyst and/or additives into a fluidized catalytic cracking unit comprises a bin for storing at least one of the catalyst and/or additives, and a loading unit in fluid communication with the storage bin and the fluidized catalytic cracking unit on a selective basis. The loading unit is capable of being evacuated so that a resulting vacuum within the loading unit draws the at least one of the catalyst and/or additives from the bin, and the loading unit is capable of being pressurized so that the least one of the catalyst and/or additives is transferred from the loading unit to the fluidized catalytic cracking unit.

Another preferred embodiment of a system for loading catalyst and/or additives into a fluidized catalytic cracking unit comprises a first bin for storing a first of the catalyst and/or additives, a second bin for storing a second of the catalyst and/or additives, and a loading unit in fluid communication with the first and second bins and the fluidized catalytic cracking unit. The system also comprises a first valve for isolating the first bin from the loading unit on a selective basis, a second valve for isolating the second bin from the loading unit on a selective basis, and a third valve for isolating the second bin from the fluidized catalytic cracking unit on a selective basis.

A preferred embodiment of a system for introducing catalyst and/or additives into a fluidized catalytic cracking unit comprises a dust collecting means in fluid communication with a storage bin holding one of the catalyst and/or additives, and a vacuum producing means in fluid communication with the dust collecting means so that the vacuum producing means draws the one of the catalyst and/or additives into the dust collecting means. The system also comprises a means for receiving the one of the catalyst and/or additives from the dust collecting means and injecting the one of the catalyst and/or additives into the fluidized catalytic cracking unit.

In another preferred embodiment, the system for injecting catalyst and/or additives into a fluidized catalytic cracking unit comprises: a dust collector in fluid communication with at least one storage bin holding one of the catalyst and/or additives; a vacuum producer in fluid communication with the dust collector so that the vacuum producer generates a vacuum within the dust collector that draws the one of the catalyst and/or additives into the dust collector; a transfer pot in fluid communication with the dust collector for receiving the one of the catalyst and/or additives from the dust collector, the transfer pot being in fluid communication with the fluidized catalytic cracking unit and a source of pressurized air so that the one of the catalyst and/or additives is transferred to the fluidized catalytic cracking unit in response to a pressure differential between the transfer pot and the fluidized catalytic cracking unit; and at least one flexible section positioned between and in fluid communication with the dust collector and the transfer pot. The at least one flexible section positioned between and in fluid communication with the dust collector and the transfer pot enables the transfer pot and its contents to be weighed, via a plurality of load cells, with little or no weight contribution and/or effect from the dust collector.

In another preferred embodiment, the system for injecting one or more catalysts and/or additives into a fluidized catalytic cracking unit comprises: a dust collector in fluid communication with at least one storage bin holding the one or more catalysts and/or additives; a transfer pot in fluid communication with the dust collector for receiving the one or more catalysts and/or additives from the dust collector, the transfer pot being in fluid communication with the fluidized catalytic cracking unit and a source of pressurized air so that the one or more catalysts and/or additives is transferred to the fluidized catalytic cracking unit in response to a pressure differential between the transfer pot and the fluidized catalytic cracking unit; at least one flexible section positioned between and in fluid communication with the dust collector and the transfer pot; and a plurality of load cells operatively adapted and positioned to weigh the transfer pot and the one or more catalysts and/or additives; wherein the at least one flexible section enables a weight reading of the plurality of load cells to contain either (i) a minimal weight contribution provided by the dust collector or (ii) no weight contribution provided by the dust collector.

A preferred process for introducing catalyst and/or additives into a fluidized catalytic cracking unit comprises generating a vacuum within a loading unit, drawing one of the catalyst and/or additives from a storage bin and into the loading unit in response to the vacuum, pressurizing the loading unit, and injecting the one of the catalyst and/or additives into the fluidized catalytic cracking unit in response to the pressurization of the loading unit.

A preferred process for loading catalyst and/or additives into a fluidized catalytic cracking unit comprises storing at least one of the catalyst and/or additives at a first location, vacuuming the at least one of the catalyst and/or additives into a loading unit positioned at a second location, and injecting the at least one of a catalyst and/or additives into the fluidized catalytic cracking unit from the loading unit.

A preferred embodiment of a system for introducing one or more particulate substances into a fluid stream comprises a dust collecting means in fluid communication with at least one storage bin holding the one or more particulate substances. The system also comprises a vacuum producing means in fluid communication with the dust collecting means so that the one or more particulate substances is drawn into the dust collecting means from the at least one storage bin by a vacuum. The system further comprises a means for receiving the one or more particulate substances from the dust collecting means and injecting the one or more particulate substances into the fluid stream.

A preferred conveying process comprises generating a vacuum within a dust collector of a loading unit, and drawing a particulate material from a storage bin and into the dust collector in response to the vacuum so that the particulate material enters a transfer pot of the loading unit adjoining the dust collector. The process also comprises pressurizing the transfer pot, and discharging the particulate material from the transfer pot in response to the pressurization of the transfer pot.

In another preferred embodiment, the process for introducing one or more catalysts and/or additives into a fluidized catalytic cracking unit comprises: generating a vacuum within a loading unit comprising a dust collector in fluid communication with and separatable from a transfer pot; drawing the one or more catalysts and/or additives from one or more storage bins and into the dust collector of the loading unit in response to the vacuum; determining a weight of the one or more catalysts and/or additives positioned in the transfer pot of the loading unit; pressurizing the transfer pot of the loading unit; and injecting the one or more catalysts and/or additives into the fluidized catalytic cracking unit in response to reaching a threshold pressure within the transfer pot of the loading unit; wherein the determining step comprises weighing the transfer pot and the one or more catalysts and/or additives positioned in the transfer pot so as to obtain a transfer pot/contents weight, wherein the transfer pot/contents weight contains either (i) a minimal weight contribution provided by the dust collector or (ii) no weight contribution provided by the dust collector.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

Figure 1:
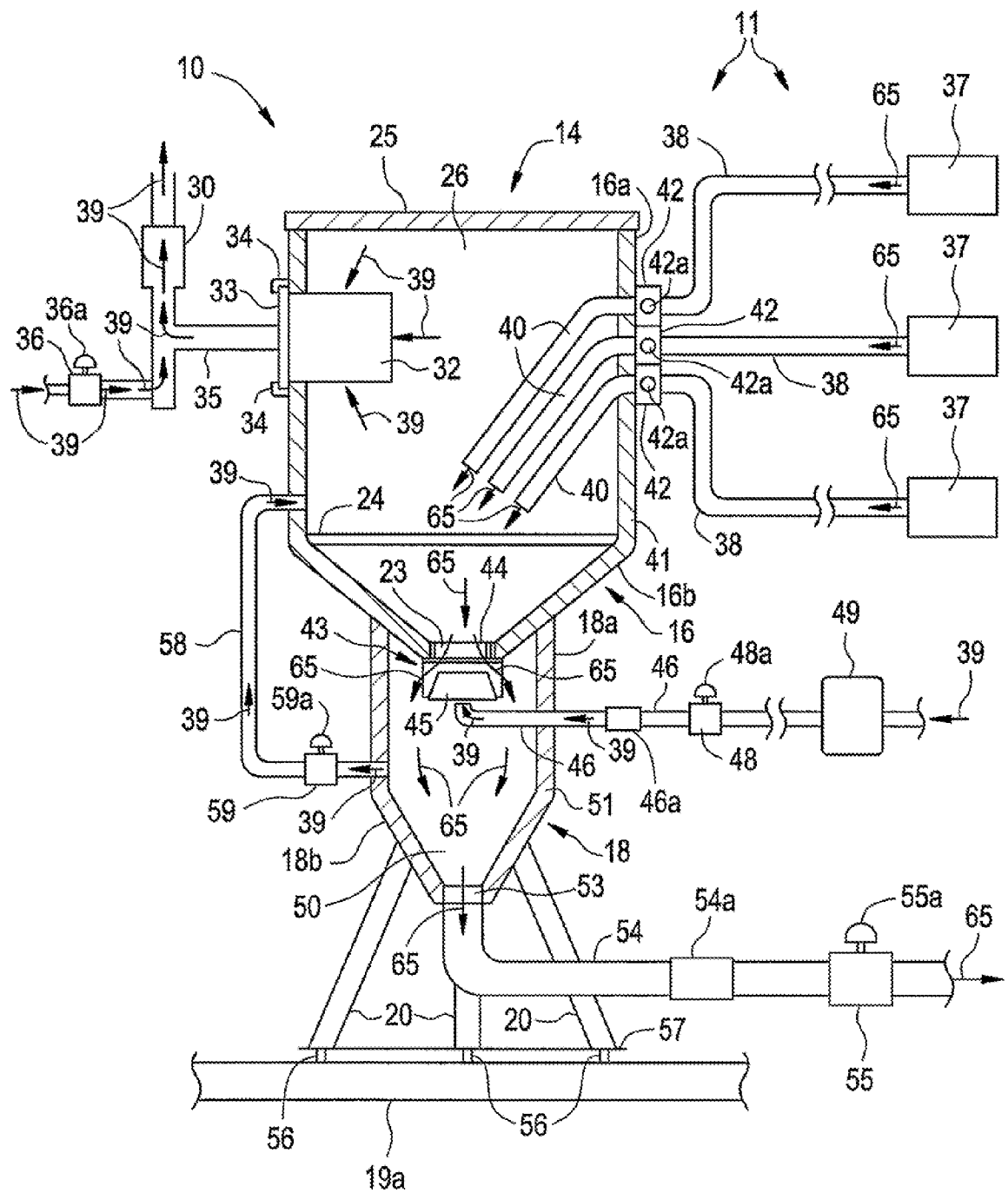
FIG. 1 is a schematic side view of a preferred embodiment of a system for injecting catalyst and/or additives into an FCC unit, showing a dust collector and a transfer pot of the system longitudinal cross section.

A preferred embodiment of a system 10 for injecting one or more catalysts and/or additives into an FCC unit is depicted in FIGS. 1-6. The loading system 10 forms part of an overall system 11 for storing and loading catalyst and/or additives. The system 11 includes the loading system 10, and one or more storage bins 37.

The loading system 10 comprises a loading unit 14 having a dust collector 16 and an adjoining transfer pot 18. The loading system 10, as discussed in detail below, produces a vacuum that draws catalyst and/or additive from the storage bins 37 and into the dust collector 16. The catalyst and/or additive falls to the bottom of the dust collector 16 and into the transfer pot 18. The transfer pot 18 is subsequently pressurized, and the catalyst and/or additive is injected into a regenerator of the FCC unit in response to the pressure within the transfer pot 18.

Figure 2:
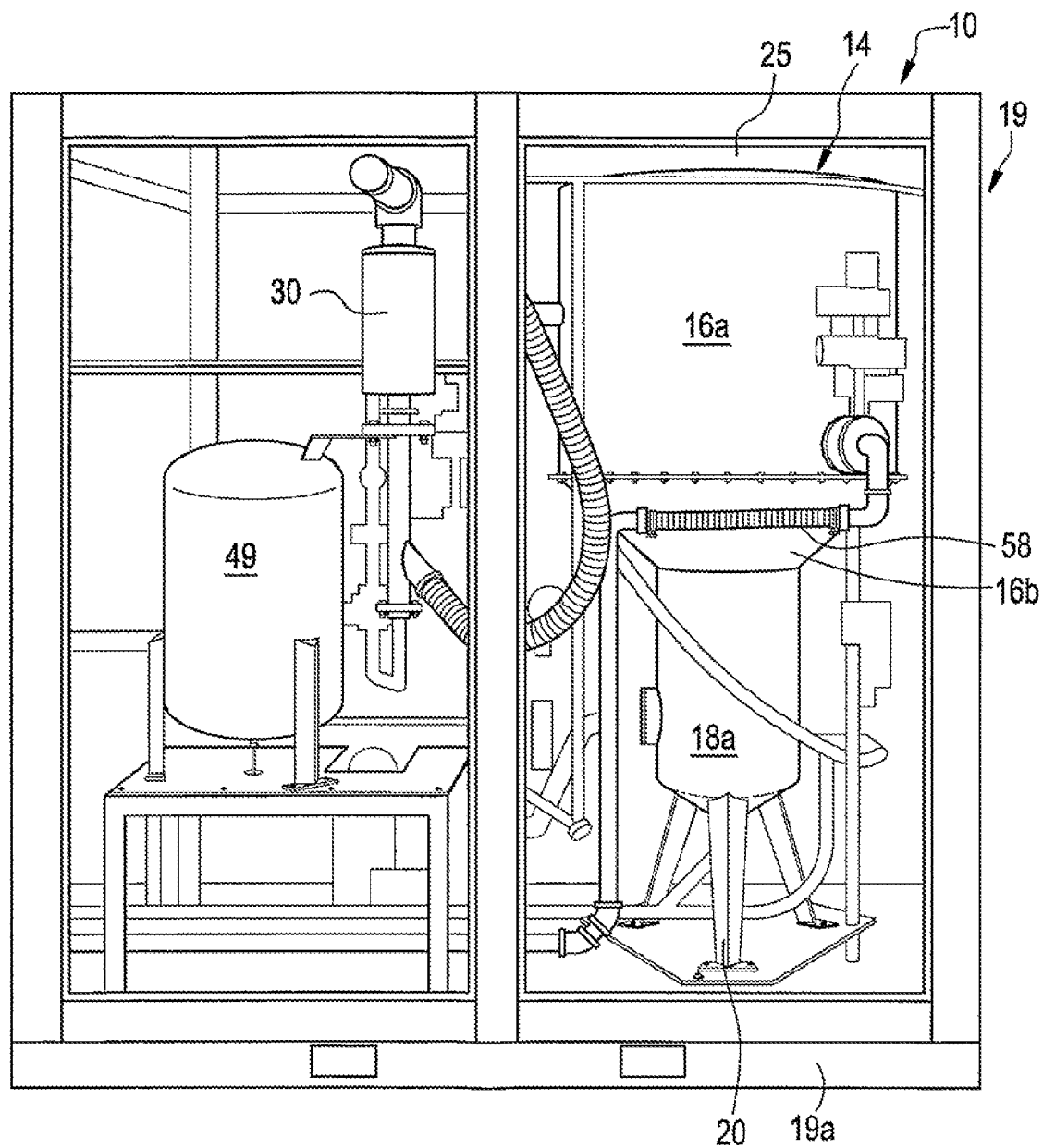
FIG. 2 is a diagrammatic side view of the system shown in FIG. 1.
Figure 3:
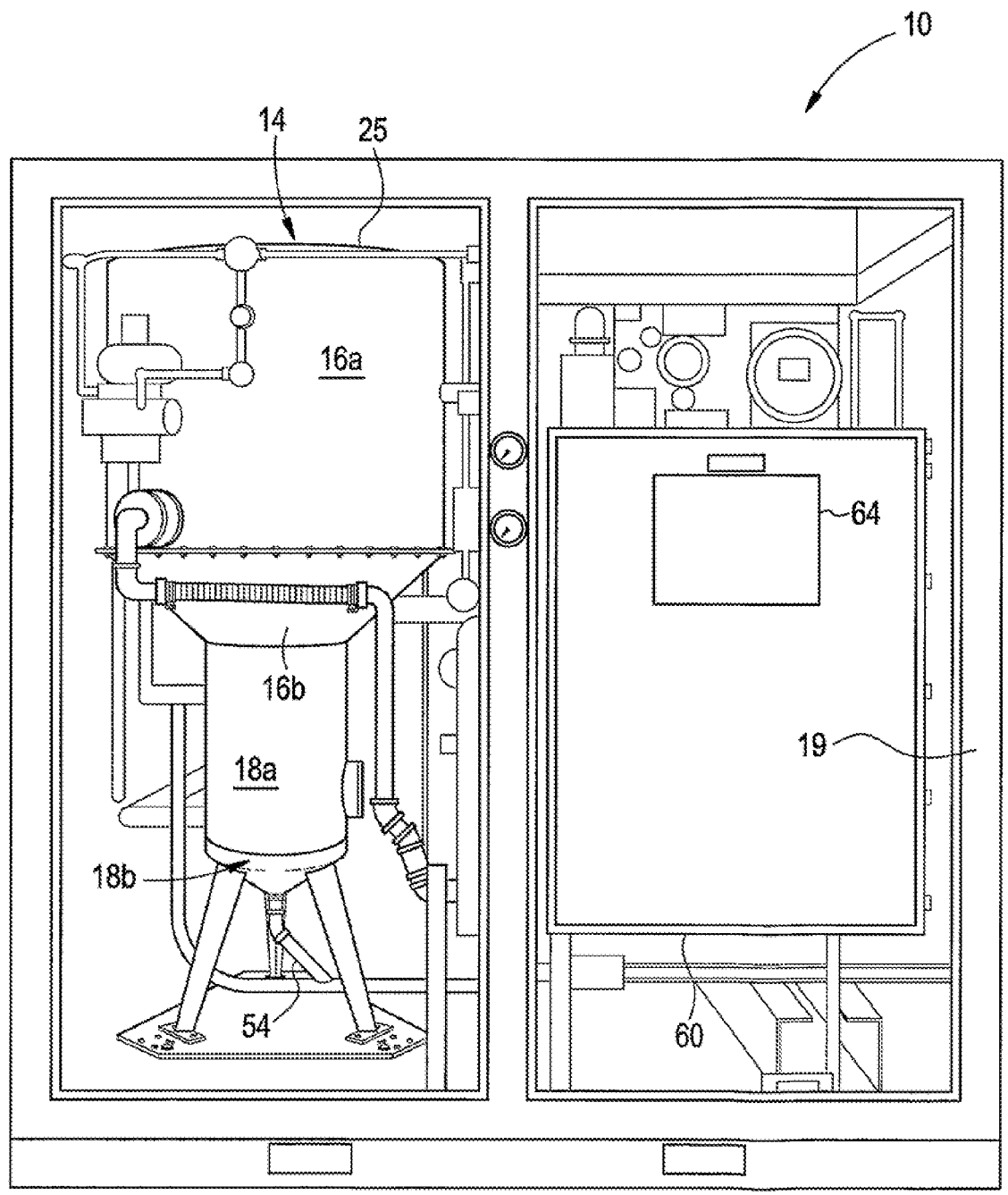
FIG. 3 is a diagrammatic side view of the system shown in FIGS. 1 and 2, from a perspective rotated approximately 180 degrees from the perspective of FIG. 2.
Figure 4:
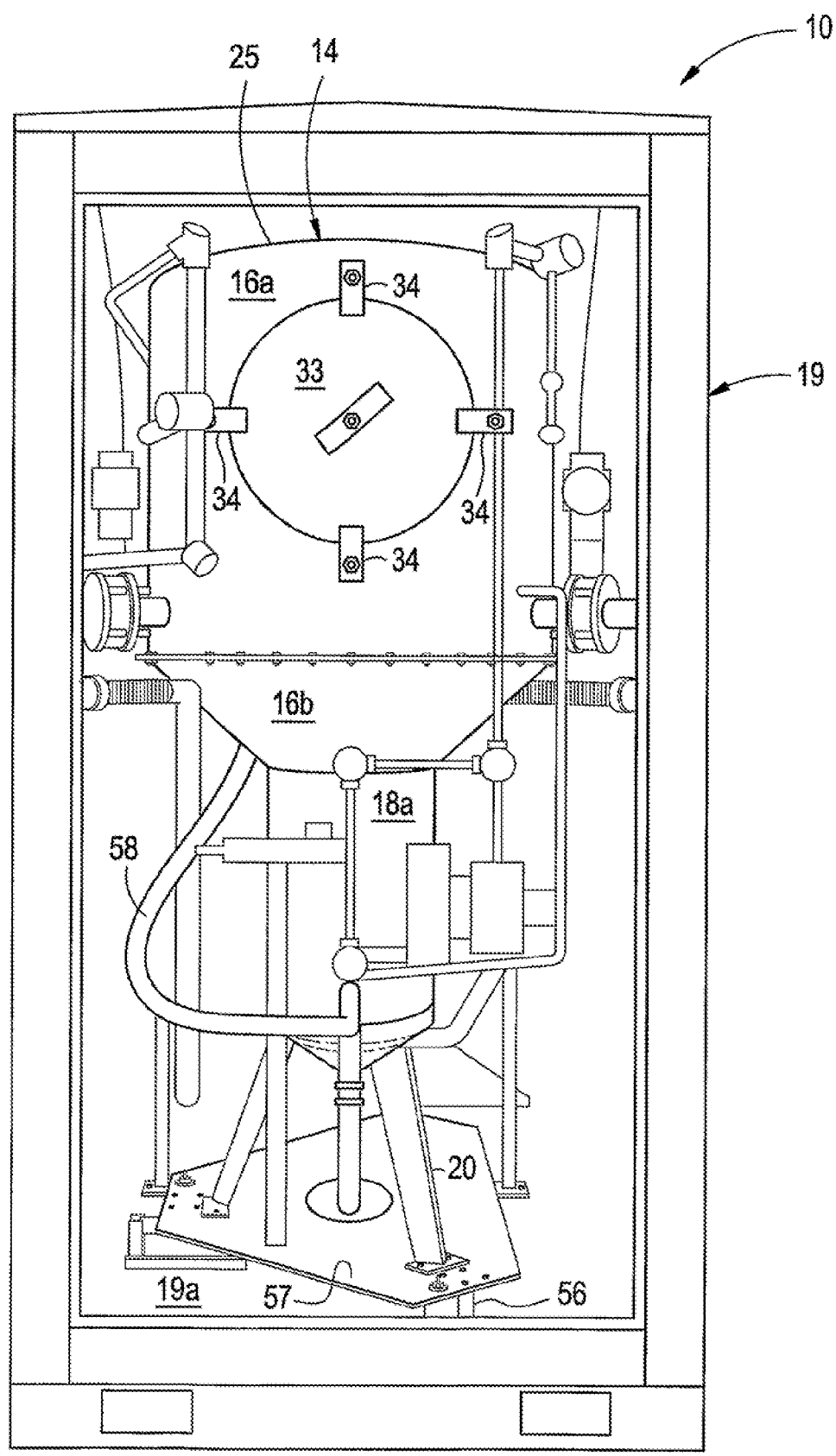
FIG. 4 is a diagrammatic side view of the system shown in FIGS. 1-3, from a perspective rotated approximately 90 degrees from the perspective of FIG. 2.

The loading unit 14 can be housed within a cabinet 19 (see FIGS. 2-4). (The cabinet 19 is shown in the figures with its side panels removed, for clarity.) The loading unit 14 is preferably supported by a plurality of legs 20 affixed to the transfer pot 18.

Cabinet 19 is optional and can be configured to accommodate the particular configuration and size of the injection system. Preferably side panels to the cabinet are removable (and/or designed as doors which are easily opened) and substantially full length and width of the enclosure to give an operator or repair person full access to the system. Alternatively, closable portals can be placed in walls that are more substantially affixed to the system's base, with the portals used for access to relatively small components of the system.

The cabinet serves to protect the system from damaging elements in the environment, e.g., plant dust, rain, direct sunlight, as well as reduces dusting created by the movement of catalyst as it is drawn in and then injected by the system. The cabinet also can retain any catalyst particulate that may spill or leak from broken or damaged hoses that transport catalyst into and throughout the system, as well as retain any fugitive emissions from the contained equipment.

The cabinet can also be designed to be large enough to provide shelter for an operator or repair person. The cabinet also "unitizes" the system, thereby making it easier to transport and install the system. Indeed, the cabinet could be designed to serve as a shipping container in addition to serving as a protective enclosure.

The dust collector 16 comprises a sidewall 17. The sidewall 17 should be of a suitable strength and thickness to withstand the presence of a vacuum within the dust collector 16.

The cross section and overall shape of the dust collector 16 can vary. The dust collector 16 depicted in the figures has a substantially cylindrical upper portion 16a, and a substantially conical lower portion 16b that adjoins the upper portion 16a. An opening 23 is formed in the center of the lower portion 16b (see FIG. 1). A screen 24 is positioned across the lower portion 16b. In other embodiments, the cross section of the upper portion 16a and the lower portion 16b can be square or rectangular, and the overall shape can be in the form of a square or rectangular column. (Directional terms such as "upper," "lower," etc. are used herein with reference to the component orientations depicted in FIG. 1. These terms are used for exemplary purposes only, and are not intended to limit the scope of the appended claims.)

The dust collector 16 also includes a cover 25. The cover 25 mates with an upper edge of the sidewall 17. A gasket is positioned between the cover 25 and the sidewall 17 to form a substantially airtight seal there between. The sidewall 17 and the cover 25 define an internal volume 26 within the dust collector 16 (see FIG. 1).

The dust collector 16 also comprises a suitable filter 32 (see FIG. 1). The filter 32 can be, for example, a Mactiflo model E376094 filter.

The filter 32 is mounted within the upper portion 16a of the dust collector 16. The sidewall preferably includes a hatch 33 to provide access to the interior of the upper portion 16a (and the filter 32) (see FIGS. 1 and 4). The hatch 33 is preferably secured the sidewall 17 of the dust collector 16 using brackets 34 that permit the hatch 33 to be removed with a minimal expenditure of time and effort, thereby facilitating replacement of the filter 32 with a minimum of time and effort. Alternative embodiments of the loading system 10 can be equipped with more than one of the filters 32.

The system 10 also comprises suitable vacuum producer 30 (see FIGS. 1 and 2). For example, the vacuum producer can be an Empire two-inch Vacutran S150 vacuum producer.

The vacuum producer 30 is mounted within the cabinet 19 (see FIG. 2). The vacuum producer 30 is preferably mounted separately from the loading unit 14. The vacuum producer 30 is in fluid communication with the filter 32 by way of a hose 35.

The vacuum producer 30 is in fluid communication with a suitable source of pressurized air (not shown). (The source of pressurized air can be the plant air typically available at refineries.) The flow of pressurized air into the vacuum producer 30 can be regulated by a suitable valve 36 having an actuator 36a (see FIG. 1).

The vacuum producer 30 can operate in a manner commonly known to those skilled in the art of vacuum-chamber design. In particular, opening the valve 36 permits the pressurized air to flow through the vacuum producer 30. The flow of pressurized air through the vacuum producer 30 causes the vacuum producer 30 to draw air from the internal volume 26 of the dust collector 16, thereby generating a vacuum within the internal volume 26. (The vacuum producer 30 draws the air through the filter 32, thereby causing the dust collector 16 to collect the dust generated by the flow of catalyst and/or additive into the dust collector 16.) The respective directions of various airflows within the loading system 10 are denoted by arrows 39 in FIG. 1.

The loading system 10 draws catalyst and/or additive from storage bins in response to the vacuum within the internal volume 26. In particular, the dust collector 16 is in fluid communication with storage bins 37 (see FIG. 1). The storage bins 37 hold catalyst and/or additives to be injected into the FCC unit. The storage bins 37 can be, for example, the shipping containers used to transport the catalyst and/or additives to the refinery at which the loading system 10 is installed.

Each storage bin 37 is coupled to the dust collector 16 by a corresponding hose (or pipe) 38. A suitable valve 42 having an actuator 42*a* is located between each hose 38 and the dust collector 16. Each valve 42 isolates its associated storage bin 37 from the dust collector 16 on a selective basis. The valves 42 are installed on the upper portion 16*a* of the dust collector 16, and are in fluid communication with the internal volume 26 by way of corresponding openings formed in the upper portion 16*a* of the dust collector 16. (The hoses 38 and valves 42 thus form part of the system 11 for storing and loading catalyst and/or additives).

Figure 8:
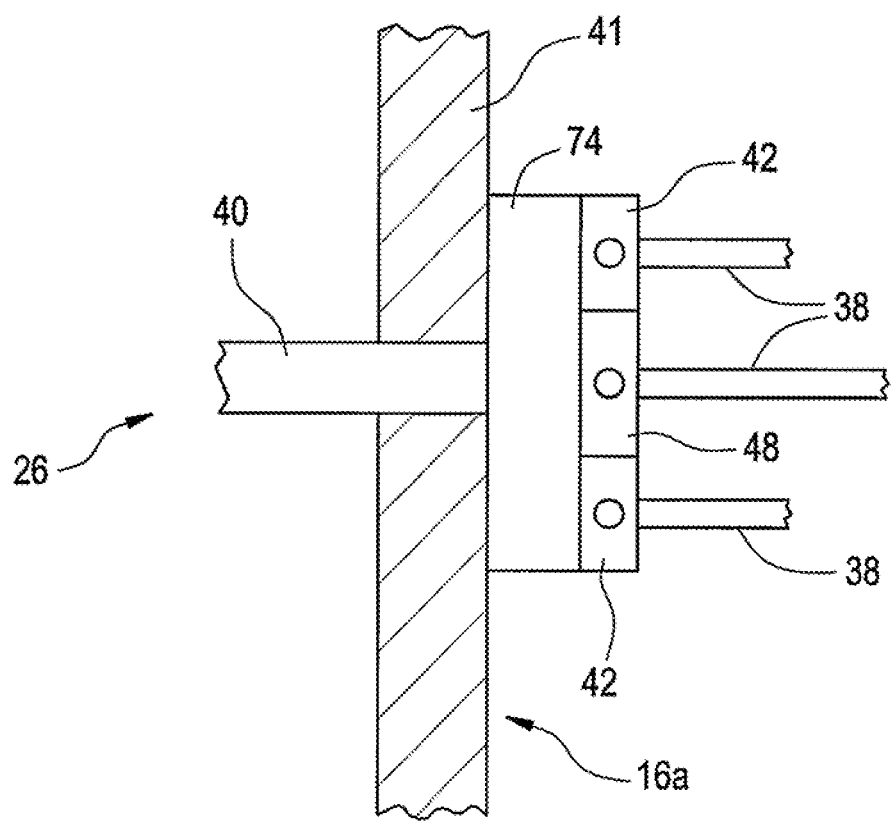
FIG. 8 is a top view of a manifold for use with an alternative embodiment of the system shown in FIGS. 1-6.

The hoses 38 can be coupled to the upper portion 16*a* by way of a common manifold 74 in alternative embodiments, as shown in FIG. 8.

The hoses 38 are preferably equipped with fittings that permit the hoses 38 to be readily removed from the dust collector 16 (or the manifold 74) and the storage bins 37.

Opening one of the valves 42 permits catalyst and/or additive to be drawn from the associated storage bin 37 by way of the associated hose 38, in response to the vacuum within the internal volume 26. The catalyst and/or additive is thus drawn directly from one of storage bins 37 and into the loading system 10, without a need to load the catalyst and/or additive into a storage hopper.

The loading system 10 is depicted as being equipped with three sets of the valves 42 and hoses 38, for exemplary purposes only. Alternative embodiments can be equipped with more or less than three valves 42 and three hoses 38, and can draw catalyst and/or additive from more or less than three of the storage bins 37.

One or more (2, 3, 4, etc.) storage bins 37 can be positioned at a location remote from the loading system 10. For example, the storage bins 37 can be located up to twenty feet from the loading system 10. (The maximum distance between the loading system 10 and the storage bins 37 is application dependent, and can vary with factors such as the capacity of the vacuum producer 30, the diameter of the hoses 38, etc. A particular value for this parameter is specified for exemplary purposes only.)

As shown in FIG. 1, the dust collector 16 includes three pipe guides 40. Each pipe guide 40 is in fluid communication with an associated one of the hoses 38.

The catalyst and/or additive drawn into the internal volume 26 by way of one of the pipe guides 40. The pipe guides 40 discharge the catalyst or additive proximate into the internal volume 26, proximate the screen 24.

Figure 9:
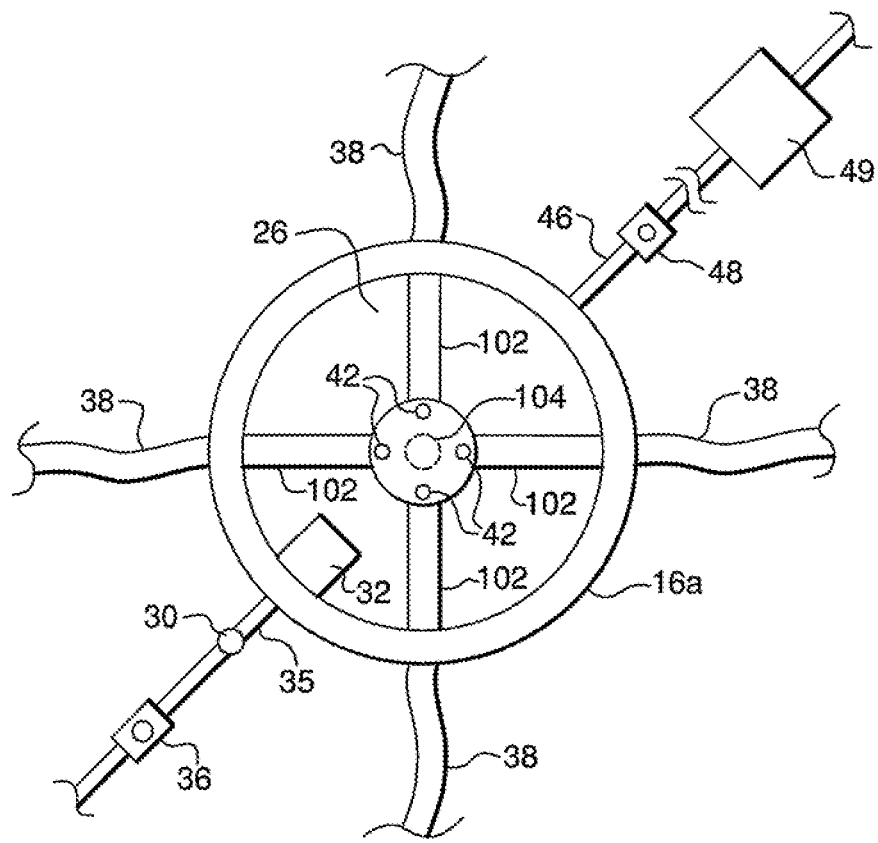
FIG. 9 is a top view of another alternative embodiment of the system shown in FIGS. 1-6, with a cover of a dust collector of the system removed.

Alternative configurations of manifold 74 include an internal manifold, such as the manifold 100 depicted in FIG. 9. In such an embodiment, one or more individual hoses 38 can be routed through portals in the upper portion 16*a*, with the portals preferably sealed via gaskets or the like. One or more pipe guides 102 can be secured to the sidewalls of the upper portion 16*a* by a suitable means such as welds, flanges, brackets, fasteners, etc., so that the pipe guides 102 extend into the upper portion 16*a*.

Each of the hoses 38 are then coupled by way of the common manifold 100 that is located inside the upper portion 16*a*. The manifold 100 can include valves, such as the valves 42, for placing the manifold 100 (and the dust collector 16) in fluid communication with the associated hose 38 and storage bin 37 on a selective basis. A single discharge pipe guide 104 (as opposed to the multiple pipe guides 40 illustrated in FIG. 1) can descend from the manifold 100 in the direction of the bottom portion of 16*b*. The end of the discharge pipe guide 104 preferably is located approximately six inches above the opening 23 formed in the lower portion 16*b* of the dust collector 16. (The optimal distance between the end of the discharge pipe guide 104 and the opening 23 can vary by application; a specific value for this distance is presented for exemplary purposes only.) This configuration of hoses 38, manifold 100, and single discharge pipe guide 104 create a "spider" arrangement of hoses such that the single discharge pipe guide 104 can be positioned in the center of the upper portion 16*a*. Centering the manifold 100 and the associated discharge pipe guide 104 insures that catalyst and/or additive is deposited at the bottom of dust collector 16. This configuration helps reduce catalyst and/or additive striking the sides of the upper portion 16*a*, and thereby reduces any potential build up of catalyst and/or additive on those walls. This configuration also potentially reduces catalyst and/or additive attrition that could occur as the catalyst and/or additive particulate strikes the sidewalls.

Figure 10:
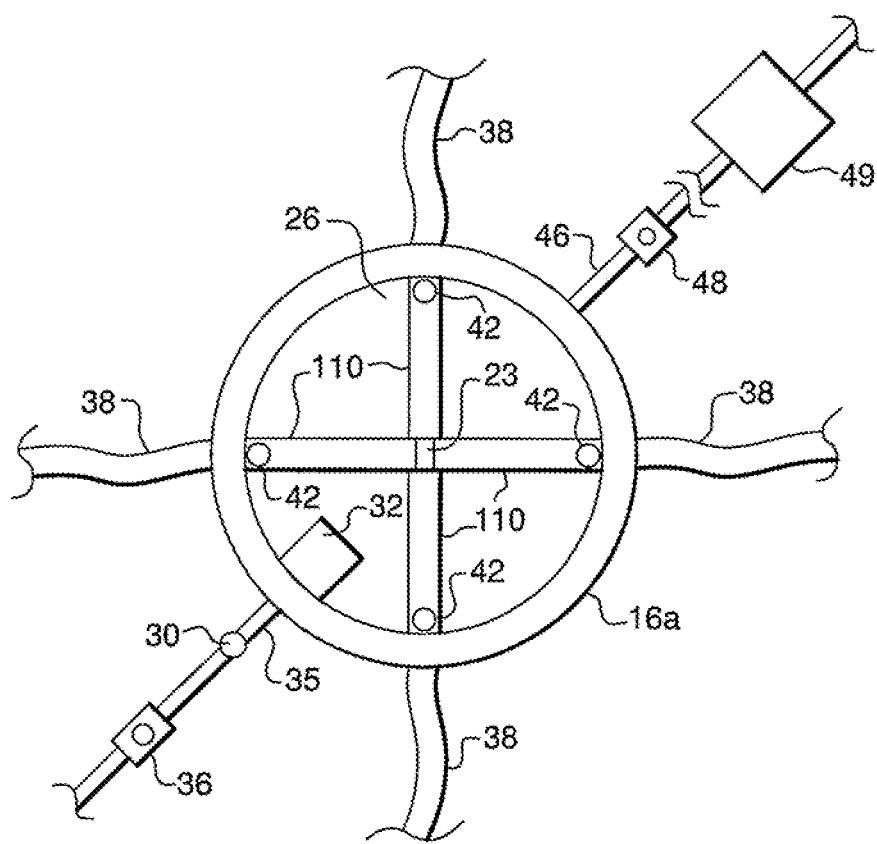
FIG. 10 is a top view of another alternative embodiment of the system shown in FIGS. 1-6, with a cover of a dust collector of the system removed.

Another arrangement for discharging the catalyst and/or additive into the dust collector 16 is depicted in FIG. 10. In this embodiment, one or more of the individual hoses 38 can be routed through portals in the upper portion 16*a*, with the portals preferably sealed via gaskets or the like. One or more pipe guides 110 can be secured to the sidewall of the upper portion 16*a* by a suitable means such as welds, flanges, brackets, fasteners, etc., so that each pipe guide 110 receives catalyst and/or additive from a respective hose 38. A valve, such as the valve 42, can be mounted on each pipe guide 110 to place the pipe guide 110 (and the dust collector 16) in fluid communication with the associated hose 38 and storage bin 37 on a selective basis. Each valve 42 can be mounted on the sidewall of the upper portion 16*a* by a suitable means such as flanges.

The pipe guides 110 each extend inward from the sidewall of the upper portion 16*a*, so that the respective ends of the pipe guides 110 are located proximate the centerline of the dust collector 16. The ends of the pipe guides 110 can be secured to each other by a suitable means such as welding, fasteners, brackets, etc. Each pipe guide 110 thus discharges catalyst and/or additive proximate the centerline of the dust collector 16. The pipe guides 110 preferably extend downward, at an angle of approximately seventy degrees in relation to the horizontal direction. (The optimal orientation of the pipe guides 110 can vary by application; a specific orientation is presented for exemplary purposes only.) The ends of the pipe guides 100 preferably are located approximately six inches above the opening 23 formed in the lower portion 16*b* of the dust collector 16. (The optimal distance between the ends of the pipe guides 110 and the opening 23 can vary by application; a specific value for this distance is presented for exemplary purposes only.) This configuration helps reduce catalyst and/or additive striking the sides of the upper portion 16*a*, and thereby reduces any potential build up of catalyst and/or additive on those walls. This configuration also potentially reduces catalyst and/or additive attrition that could occur as the catalyst and/or additive particulate strikes the sidewalls.

It should be noted that the depiction of the system 11 in FIG. 1 is schematic in nature, and the relative positions of the various hoses, piping, etc. of the system 11 can be different than those depicted in FIG. 1. For example, the openings formed in the upper portion 16a of the dust collector 16 to accommodate the hoses 38 can be positioned around the circumference of the upper portion 16a, in lieu of the vertical arrangement depicted in FIG. 1. In other embodiments, multiple hoses can be positioned on two or more sides of upper portion 16a.

The catalyst or additive drops toward the bottom of the dust collector 16, i.e., toward the lower portion 16b, after being discharged from the pipe guides 40 (or the discharge pipe guide 104 or pipe guides 110) due to gravity. The catalyst and/or additive passes through the screen 24 as it drops (see FIG. 1). The mesh of the screen 24 is preferably chosen to block the passage of relatively large clumps or catalyst and/or additive (or foreign objects), while permitting relatively fine granules of catalyst and/or additive to flow freely there through. The substantially conical shape of the lower portion 16b directs the catalyst and/or additive toward the opening 23 in the lower portion 16b.

The loading system 10 includes the valve 43 for covering and sealing the opening 23 on a selective basis. The valve 43 can be, for example, a plug valve comprising a seat 44 and plug 45. The seat 44 is secured to the lower portion 16b, around the periphery of the opening 23. The plug 45 is movable between an upper and a lower position (the plug 45 is depicted in its lower position in FIG. 1).

The valve 43 is actuated by pressurized air. The pressurized air is directed to the valve 43 by way of piping 46 that extends through the transfer pot 18. The flow of pressurized air into the piping 46 can be initiated and interrupted on a selective basis by a valve 48 in fluid communication with the piping 46. The valve 48a includes an actuator 48a.

The pressurized air impinges upon the plug 45 after exiting of the piping 46. More particularly, the pressurized air is directed to the interior of the plug 45, and urges the plug 45 into its closed position against the seat 44. The contact between the plug 45 and the seat 44 substantially seals the opening 23.

The plug 45 drops from its closed to its open position when the pressurized air is interrupted by closing the valve 48. The resulting gap between the plug 45 and the seat 44 permits catalyst and/or additive reaching the bottom of the lower portion 16b to pass through the opening 23 and into the transfer pot 18 (see FIG. 1).

The loading system 10 preferably includes a volume chamber and moisture trap 49 in fluid communication with the piping 46 (see FIGS. 1 and 2). The volume chamber and moisture trap 49 removes moisture from the pressurized air directed to the valve 43.

The transfer pot 18 comprises a sidewall 51. The sidewall 51 should be of a suitable strength and thickness to withstand pressurization of the transfer pot 18.

The cross section and overall shape of the transfer pot 18 can vary. The transfer pot 18 depicted in the figures has a substantially cylindrical upper portion 18a, and a substantially conical lower portion 18b that adjoins the upper portion 18a. The upper portion 18a and the lower portion 18b of the transfer pot 18, and the lower portion 16b of the dust collector 16 define an internal volume 50 within the transfer pot 18 (see FIG. 1). (The lower portion 16b and the valve 43 thus form a boundary between the internal volume 26 of the dust collector 16 and the internal volume 50 of the transfer pot 18.)

An opening 53 is formed in the center of the lower portion 18a of the transfer pot 18. The transfer pot 18 is coupled to the regenerator of the FCC unit by piping 54. The piping 54 is in fluid communication with the opening 53. Catalyst and/or additive enters the piping 54 by way of the opening 53 and subsequently flows to the regenerator, as discussed below.

A valve 55 having an actuator 55a is installed in piping 54. The valve 55 permits the transfer pot 18 to be isolated from the regenerator on a selective basis. A suitable transfer pot 18 can be obtained, for example, by adapting a Clemtex, Inc. model 2452 six-cubic foot sandblasting pot, or a model 1648 two-cubic-foot sandblasting pot to mate with the dust collector 16. (The sandblasting pot can be mated with the dust collector 16 by securing the lower portion 16b of the dust collector 16 to the upper periphery of the sandblasting pot by a suitable means such as welding.)

The loading unit 14 is supported by a plurality of load cells 56 (see FIGS. 1 and 4). The load cells 56, as discussed below, provide a measure of the weight of the loading unit 14 in both an unloaded and loaded condition, i.e., with and without catalyst and/or additive therein. The load cells 56 are preferably mounted between a base 19a of the cabinet 19, and a plate 57 fixedly coupled to the legs 20 of the transfer pot 18.

Figure 5:
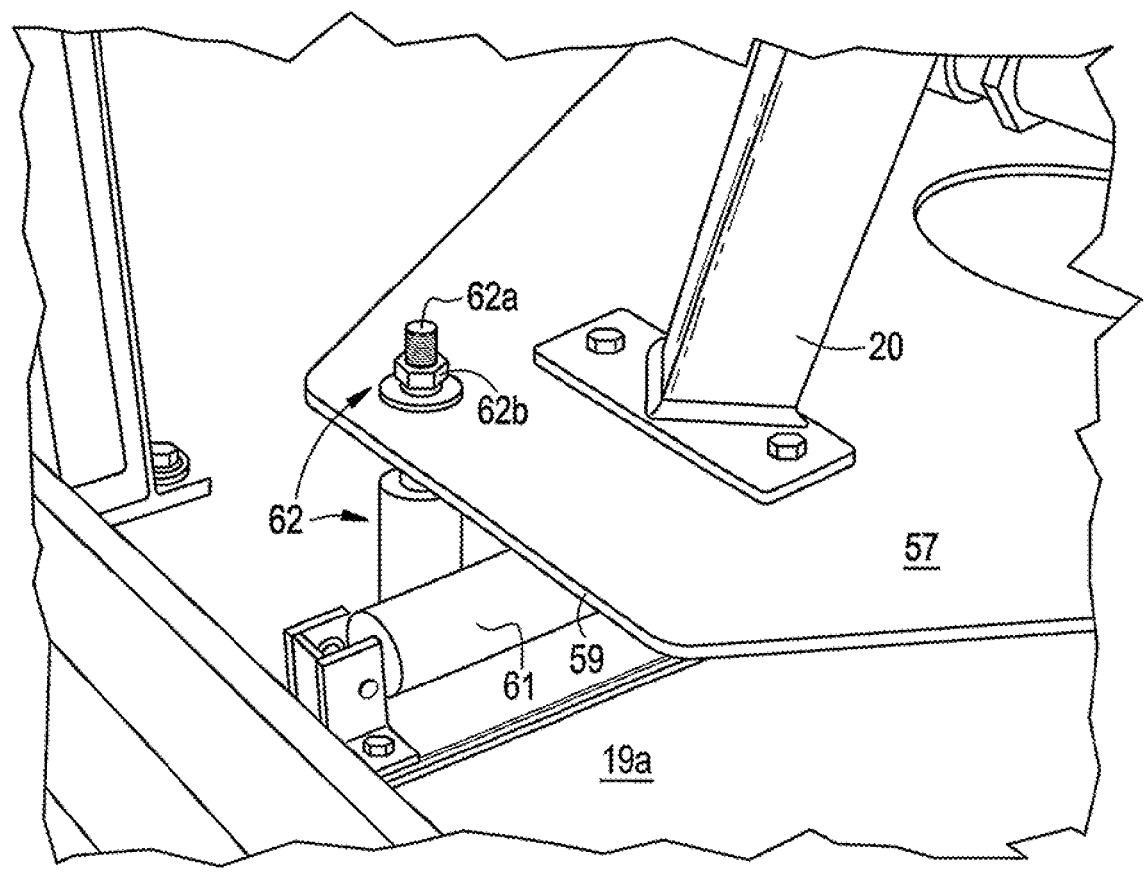
FIG. 5 is a magnified view of the area designated "A" in FIG. 3.

Each load cell can be restrained from substantial horizontal movement by a corresponding restraint 61 (the restraints 61 are shown only in FIG. 5, for clarity.) Each restraint 51 is pivotally coupled to the base 19a of the cabinet 19.

The loading system 10 can include a plurality of jack assemblies 62 (the jack assemblies 62 are shown only in FIG. 5, for clarity.) Each jack assembly 62 comprises a threaded shaft 62a fixedly coupled to the base 19a of the cabinet 19. Two nuts 62b are threadably coupled to each shaft 62a. The nuts 62b are located above and below the plate 57. The lower nuts 62b can be raised so that the lower nuts 62b support the plate 57 (and the portion of the loading system 10 positioned on the plate 57). The upper nuts 62b can be lowered to lock the plate 57 in position, i.e., the plate 57 can be sandwiched between the upper and lower nuts 62b.

The jack assemblies 62 can thus substantially isolate the load cells 57 from the weight of the loading system 10. This feature can be used, for example, to protect the load cells 57 from being damaged by impact loads during shipping of the loading system 10.

External connections to the loading unit 14 are preferably configured so as to introduce a negligible tare into the load cell readings. For example, the piping 54 includes a flexible sections 54a that substantially decouples the transfer pot 18 from the portion of the piping 54 connected to the regenerator, thereby minimizing any tare introduced into the load cell readings (see FIG. 1). The piping 46 likewise includes a flexible section 46a that substantially decouples the transfer pot 18 from the portion of the piping 46 connected to the plant-air equipment. Moreover, the hoses 35, 38 preferably have sufficient flexibility so that any tare introduced thereby is negligible.

The internal volume 26 of the dust collector 16 and the internal volume 50 of the transfer pot 18 are in fluid communication on a selective basis by way of piping 58. A valve 59 having an actuator 59a is located in the piping 58 to selectively open and close the path formed by the piping 58. The piping 58 is used to equalize the pressures within the internal volumes 26, 50, as discussed below.

Figure 6:
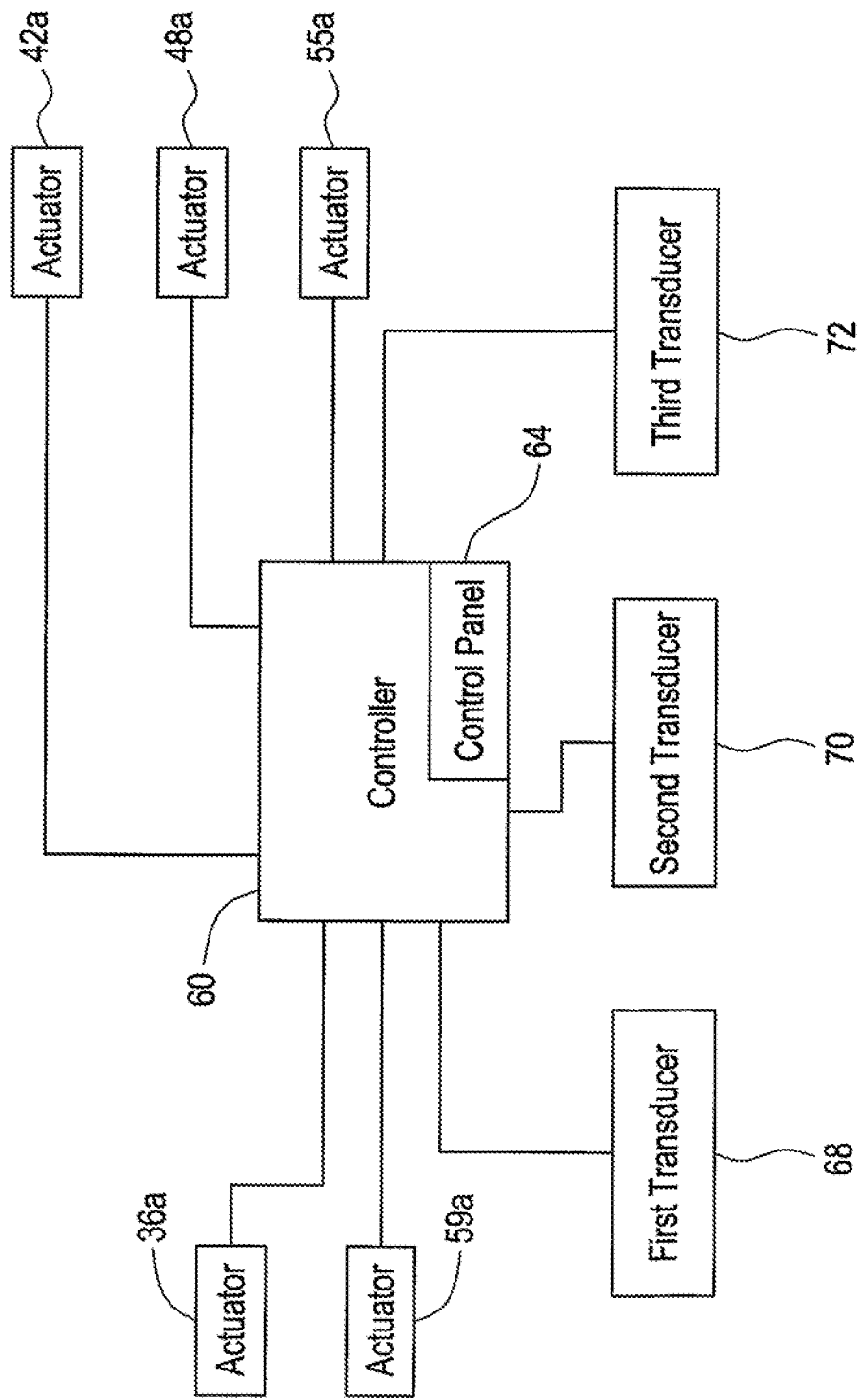
FIG. 6 is a block diagram depicting a control system of the system shown in FIGS. 1-5.

The loading system 10 preferably comprises a controller 60 (see FIGS. 3 and 6). The actuators 36a, 42a, 48a, 55a, 59a of the respective valves 36, 42, 48, 55, 59 are electrically coupled to the controller 60. This feature permits the operation of the valves 36, 42, 48, 55, 59 to be controlled by the controller 60.

The controller 60 is a programmable loop controller (PLC), although virtually any type of computing device such as a minicomputer, microcomputer, etc. can be used as the controller 60 in alternative embodiments. A server or mainframe computer that controls other equipment and processes at the refinery in which the loading system 10 is operated can also be used to control the loading system 10 in the alternative. For example, a computer based system known as a "distributed control system" or DCS is an example of a centralized system used by FCC unit operators to control a number of unit operations. Controller 60 can be coupled to and/or communications lines can be established between controller 60 and the DCS so that the DCS controls the loading system through the controller.

The controller 60 can include a control panel 64 for inputting commands and operating data to the controller 60 (see FIGS. 3 and 6). The controller 60 and the control panel 64 can be mounted on the cabinet 19. The control panel 64 by itself, or both the control panel 64 and the controller 60 can be mounted at a convenient location remote from the remainder of the loading system 10 in alternative embodiments. For example, the control panel 64 can be mounted in a central control room of the refinery, thus allowing the operation of the loading system 10 to be controlled on a remote basis.

The controller 60 can be configured to cause a predetermined amount of catalyst and/or additive to be injected into the regenerator. The predetermined amount can be input to the controller 60 by the user via the control panel 64.

Moreover, the controller 60 can be configured to facilitate injection of the catalyst and/or additive on a cyclical basis. For example, the controller 60 can be programmed to facilitate the injection of a predetermined amount of additive over a twenty-four hour period, i.e., per day, using a predetermined number of discrete injections over that period. The operation of the loading system 10 over one such cycle is described below, and is depicted in the form of a flow diagram in FIG. 7.

(The controller 60 can also be configured to facilitate injection of the catalyst and/or additive on a non-cyclical basis. In other words, the controller 60 can be programmed to facilitate periodic injections of varying amounts of catalyst and/or additive.)

The total amount of catalyst and/or additive to be injected over the twenty-four hour period can be input to the controller 60 by the user using the control panel 64. The number of discrete injections to be performed per day can also be input by way of the control panel 64. (The controller 60 can be programmed to operate based on other inputs in alternative embodiments. For example, the controller 60 can be programmed to inject a predetermined amount of additive per cycle, using predetermined interval between injections.)

The controller 60 can be programmed to automatically calculate the amount of catalyst and/or additive to be injected during each cycle based on the above-noted inputs. The controller 60 can also be programmed to calculate the time interval between the start of each injection. The interval is calculated by dividing twenty-four hours by the required number of injections per day. Moreover, the controller 60 can be configured to accept an input denoting the particular storage bin 37 from which the catalyst and/or additive is to be drawn.

Figure 7:
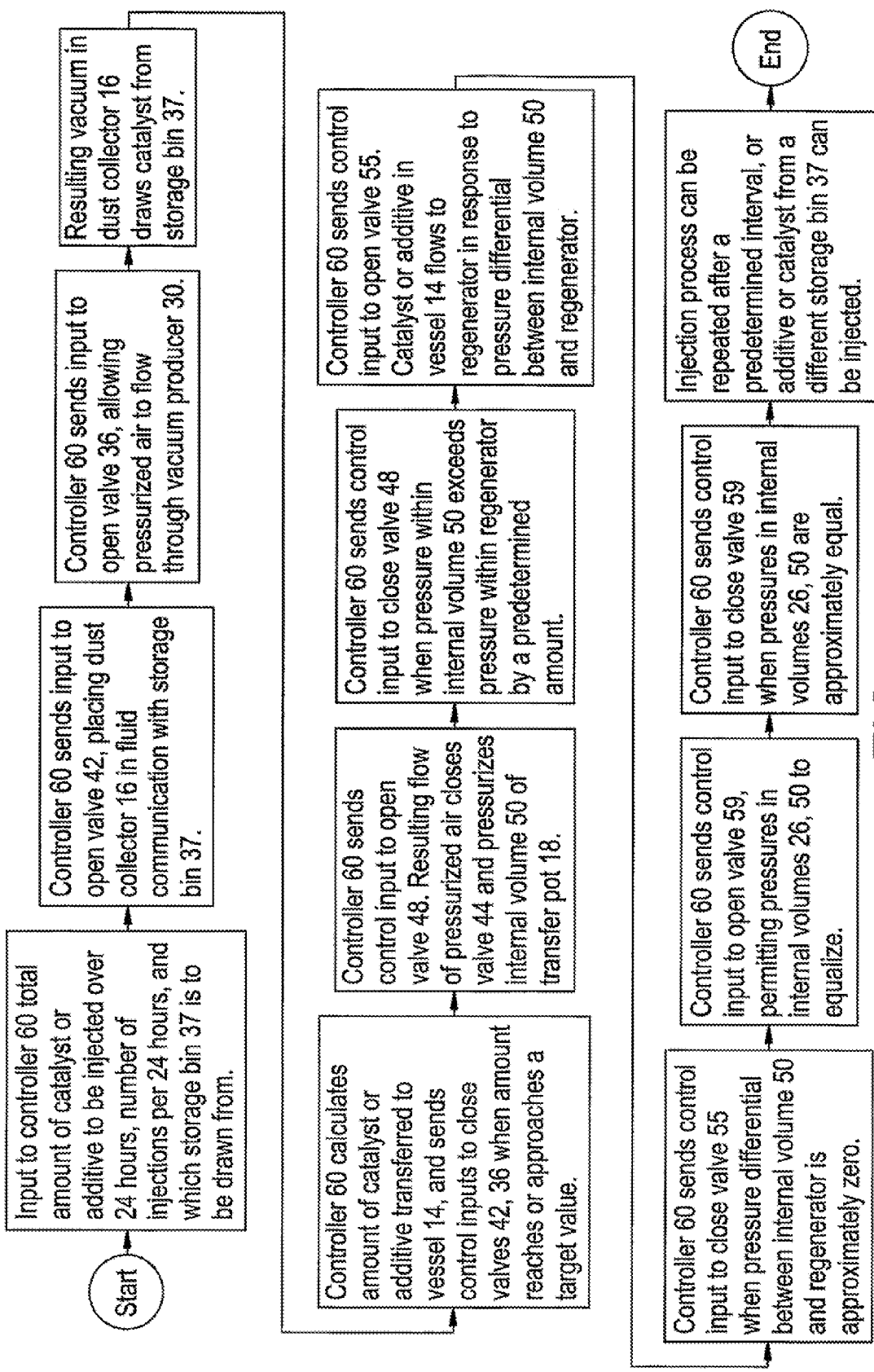
FIG. 7 is a flow diagram depicting operation of the system shown in FIGS. 1-6.

The controller 60 sends a control input to the actuator 42a of the valve 42 of the particular storage bin 37 from which the catalyst and/or additive is to be drawn (see FIG. 7). The control input causes the actuator 42a to open the valve 42, thereby placing the storage bin 37 in fluid communication with the dust collector 16. (The valves 36, 42, 48, 55, 59 are in their respective closed positions, and the plug 45 of the valve 43 is in its open (lower) position at the start of the cycle.)

The controller 60 also sends an input to the actuator 36a of the valve 36, thereby allowing pressurized air to flow through the vacuum producer 30. The vacuum producer 30 creates a vacuum within the internal volume 26 of the dust collector 16 in response to the flow of pressurized air therethrough, as discussed above.

The vacuum within the internal volume 26 draws the catalyst and/or additive from the storage bin 37 and into the upper portion 16a of the dust collector 16. (The direction of travel of the catalyst and/or additive through the loading system 10 is denoted by arrows 65 in FIG. 1.) The catalyst and/or additive subsequently falls toward the lower portion 16b due to gravity, and enters the transfer pot 18 by way of the opening 23 in the lower portion 16b, as noted previously.

The controller 60 continually monitors the weight of the loading unit 14, and the weight of the catalyst and/or additive added thereto. (The combined weight of the loading unit 14 and any catalyst and/or additive therein is hereinafter referred to as the "live weight" of the loading system 10). In particular, the load cells 56 are electrically coupled to the controller 60. The controller 60 receives inputs from each of the load cells 56, and adds the inputs to determine the live weight of the loading system 10.

The controller 60 calculates the amount of catalyst and/or additive that is added to the loading system 10. The controller 60 performs this calculation by subtracting the live weight of the loading system 10 at a given instant from the live weight of the loading system 10 at the start of the cycle, i.e., immediately prior to the opening of the valves 36, 42 (the loading unit 14 is assumed to be substantially empty of catalyst and/or additive at the start of the cycle).

The controller 60 stops the flow of catalyst and/or additive to the dust collector 16 as the amount of catalyst and/or additive added to the loading system 10 approaches the amount to be injected into the regenerator during each cycle (this amount is subsequently referred to as a "target value"). In particular, the controller 60 sends a control input to the actuator 42a of the open the valve 42 as the weight of the catalyst of additive approaches its target value. The control input causes the valve 42 to close, thereby interrupting the flow of catalyst and/or additive to the dust collector 16. (The controller 60 can be programmed to commence the closing of the valve 42 when the weight of the catalyst and/or additive is below the target weight by a predetermined amount, so as to compensate for the lag between the issuance of the "close" command to the valve 42, and the point at which the valve 42 is fully closed).

The controller 60 also sends a control input to the actuator 36a of the valve 36 as the weight of the catalyst of additive in the loading system 10 reaches its target value. The control input causes the actuator 36a to close the valve 36, thereby interrupting the flow of pressurized air through the vacuum producer 30.

The controller 60 subsequently sends a control input to the actuator 48a of the valve 48 to cause the valve 48 to open. Opening the valve 48 permits pressurized air to enter the internal volume 50 of the transfer pot by way of the piping 46. The pressurized air impinges on the plug 45 of the valve 43 upon exiting the piping 46, and thereby urges the plug 45 into its closed (upper) position against the lower portion 16b of the dust collector 16, as discussed above. The contact between the plug 45 and the lower portion 16b covers and seals the opening 23.

The pressurized air pressurizes the internal volume 50 of the transfer pot 18 after the opening 23 has been sealed by the plug 45. (The pressurized air, as discussed above, is dried by the volume chamber and moisture trap 49 before reaching the transfer pot 18, thereby minimizing the potential for contamination of the catalyst and/or additive within the transfer pot 18.)

The controller 60 receives an input from a first pressure transducer 68 that measures the pneumatic pressure in the internal volume 50 (see FIG. 6). The controller 60 also receives an input from a second pressure transducer 70 that measures the pneumatic pressure in the regenerator proximate the location at which the catalyst and/or additive is injected.

The controller 60 sends a control input to the actuator 48a of the valve 48 when the difference between the pneumatic pressures in the internal volume 50 and the regenerator 14 reaches a predetermined value, i.e., when the pressure in the internal volume 50 exceeds the pressure in the regenerator by a predetermined amount. This control input causes the valve 48 to close.

The controller 60 subsequently sends a control input to the actuator 55a of the valve 55 to cause the valve 55 to open. The differential between the pressures in the internal volume 50 and the regenerator causes the catalyst and/or additive in the transfer pot 18 to flow into the regenerator by way of the piping 54.

The controller 60 sends a control input to the actuator 55a to close the valve 55, after a predetermined interval has passed following issuance of the control input to open the valve 55. (The predetermined interval should be chosen so as to allow sufficient time for substantially all of the catalyst and/or additive in the transfer pot 18 to be injected into the regenerator). Alternatively, the controller 60 can send a control input to the actuator 55a to close the valve 55 when the pressure differential between the internal volume 50 and the regenerator reaches approximately zero.

The controller 60 subsequently sends a control input to the actuator 59a of the valve 59 to cause the valve 59 to open. The opening of the valve 59 permits the pneumatic pressures within the internal volumes 26, 50 to substantially equalize. In particular, opening the valve 59 relieves the relatively high pressure in the internal volume 50 (which is approximately equal to pressure within the regenerator 14) by way of the piping 58.

The controller 60 sends a control input to the actuator 59a of the valve 59 when the pressure differential between the internal volumes 26, 50 is approximately zero (the pneumatic pressure in the internal volume 26 can be measured by a third pressure transducer 72 located therein). This control input causes the valve 59 to close.

The controller 60 can be programmed to repeat the above process after the calculated interval between the start of each injection cycle (discussed above) has passed.

Moreover, the controller 60 can be programmed to inject catalyst and/or additive from any of the other storage bins 37 after the above-described cycle has been completed. In other words, another injection cycle can be performed in a manner identical to that described above, with the exception that the valve 42 associated with one of the other storage bins 37 can be opened to allow the catalyst and/or additive from that particular storage bin 37 to be drawn into the dust collector 16.

Vacuuming the catalyst and/or additive directly from its storage bin 37 can provide substantial flexibility in the operation of the loading system 10. For example, the loading system 10 can draw catalyst and/or additive from virtually any location at the refinery accessible by a hose such as the hose 38. Hence, the storage bins 37 can be positioned at an optimal location within the refinery. Moreover, the use of vacuum as a means to transport the catalyst and/or additive to the loading system 10 can permit the catalyst and/or additive to be drawn directly from its shipping container. Hence, the expenditure of time and labor associated with transferring the catalyst and/or additive from its shipping container to a storage unit can be eliminated through the use of the loading system 10.

Moreover, vacuuming the catalyst and/or additive directly into the dust collector 16 can obviate the need to transfer the catalyst and/or additive into a relatively large storage hopper (as is typically required with conventional loaders). Hence, the expenditure of time and labor associated with transferring the catalyst and/or additive to a storage hopper can be eliminated through the use of the loading system 10.

Eliminating the need for a storage hopper can also minimize the amount of space needed to accommodate the loading system 10. For example, the footprint the loading system 10 is approximately four feet by four feet, and the maximum height of the loading system is approximately five feet. A conventional loader of comparable capacity (with its storage hopper) can have a footprint of approximately five feet by eight feet, and a height of approximately twenty feet. (The dimensions of the loading system 10 will vary by application, and specific dimensions are provided herein for exemplary purposes only.) Moreover, in contradistinction to many conventional loaders, the loading system 10 can be installed without the use of special mounting provisions such as a base specifically tailored to a particular installation.

The loading system 10 can be repositioned with relative ease due to the absence of a storage hopper. In particular, the absence of a storage hopper provides a measure of portability to the loading system 10, and can facilitate movement of the loading system 10 between different locations within the refinery (or between different refineries) with a minimal expenditure of time and effort in comparison to conventional loaders. Portability and ease of use for the user of the loading system 10 is further enhanced when the loading system 10 is used in conjunction with portable storage bins, e.g., known as "totes," which are normally built to hold approximately 2,000 pounds (approximately 900 kilograms) of catalyst and/or additive.

The absence of a storage hopper, it is believed, can also minimize the amount of time necessary to install the loading system 10 in relation to conventional loaders. The ability to install the loading system 10 in a minimal amount of time can be particularly beneficial, for example, where the use of the loading system 10 is required on an immediate basis to comply with a particular regulatory standard.

The loading system 10 can be used to inject different types of catalyst and/or additives with no mechanical reconfiguration, and without the need to unload and reload a storage hopper. In particular, the loading system 10 can inject one type of catalyst and/or additive from one of the storage bins 37, and can immediately thereafter inject another type of catalyst from another of the storage bins 37 by manipulating the valves 42 in the appropriate manner. Of course, the loading system 10 can also be used to load product stored in just one storage bin. In any event, the need for multiple loaders to inject different types of catalyst and/or additives can thus be eliminated through the use of the loading system 10. It is believed that that substantial savings in time, labor, refinery space, and money can be achieved by eliminating the need to purchase, install, and maintain multiple loaders each dedicated to a particular type of catalyst and/or additive.

Eliminating multiple loaders and employing the invention also eliminates multiple lines from the loaders being connected to the catalyst and/or additive addition line of the FCC unit, and in particular the catalyst and/or additive addition line to the FCC unit's regenerator. Having multiple lines routed into the catalyst and/or additive addition line can lead to blockages at the point where the multiple lines converge, or causes blockages close thereto. Typical embodiments of the invention, however, are designed to have only one supply line exiting the loading system and to be connected to the catalyst and/or additive addition line of the FCC unit, and therefore do not provide a routing configuration that leads to the aforementioned blockages.

Eliminating the use of a storage hopper can also reduce the amount of moisture to which the catalyst and/or additive is exposed. In particular, the use of the loading system 10 permits the catalyst and/or additive to remain in the storage bins 37 until a point immediately prior to its injection into the regenerator 14. The environment in the storage bins 37, it is believed, can be controlled more closely than that within a storage hopper. In particular, catalyst and/or additive is typically exposed to plant air when being transported to and stored in a hopper. Plant air is often a source of moisture, oil based products, or other contamination that can adversely affect catalyst and/or additive. Hence, minimizing the exposure of the catalyst and/or additive to plant air, as in the loading system 10, can reduce the potential for contamination of the catalyst and/or additive. Reducing such contamination also reduces the catalyst and/or additive from agglomerating or clumping together. Such agglomeration makes the catalyst and/or additive less fluid, and can lead to plugging of hoses and supply lines. The invention thereby helps insure that the catalyst remains fluid as it is transported through the system.

As a result of the invention reducing contamination and inadvertent water absorption, the invention can be employed to load and/or transport hygroscopic material wherein it is desirable to process, handle and deliver such material with little increase in water uptake. By "hygroscopic", it is meant having the property of absorbing atmospheric moisture. Hygroscopic materials include, but are not limited to, food products, pharmaceuticals and industrial chemicals, as well as catalyst and/or additives, e.g., FCC catalysts and/or additives. The invention is also suitable for delivering materials that are formulated or otherwise possess pyrophoric properties when used, e.g., spark or flame inducing.

For the purpose of understanding such uses, one can refer to earlier descriptions relating to delivering catalyst and/or additive and apply those teachings when using the invention to store, process, handle and/or deliver hygroscopic or pyrophoric material. For example, it is envisioned that the invention be can used to transport and/or deliver hygroscopic material and pyrophoric material to delivery vehicles, reactor units, mixers, or storage containers designed for delivery of the materials to individual consumers of the relevant product.

The pressurized volume loading system 10 is believed to be less than that of conventional loaders of comparable capacity. Hence, less pressurized air is required to operate the loading system 10 in comparison to conventional loaders. This feature can reduce the operating cost of the loading system 10 in relation to conventional loaders. For example, in instances where multiple conventional loaders are employed in a plant, consumption of pressurized plant air can be significant, especially when multiple conventional loaders are being operated simultaneously. Indeed, there can be large pressure drops when simultaneously using multiple loaders of the conventional type. Such pressure drops can lead to incomplete delivery of catalyst and/or additive, as well detrimentally affect the performance of other plant operations that employ plant air. These pressure drops, however, can be avoided when using typical embodiments of the invention.

The loading unit 14 is substantially isolated from sources of pressurized air as the catalyst and/or additive is transferred thereto, due primarily to the use of a vacuum to transfer the catalyst and/or additive. Hence, the potential for the readings of the load cells 56 to be biased by forces induced by pressurized air is believed to be minimal. (Some types of conventional loaders, as discussed above, transfer catalyst and/or additive under pressure from a storage hopper to a transport unit. The pressurized air used to affect the transfer can adversely affect readings of the transfer pot's weight.)

Figure 11:
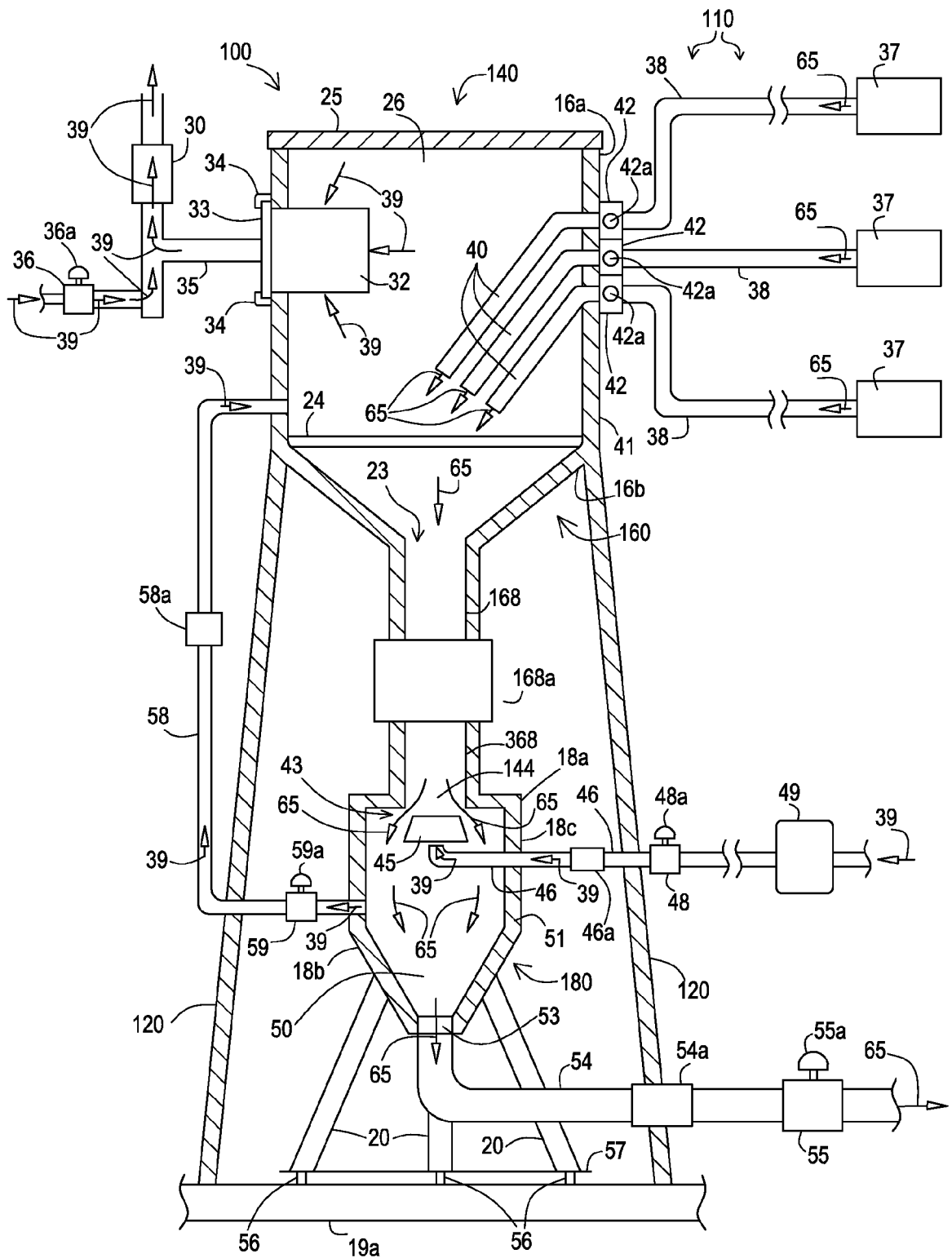
FIG. 11 is a schematic side view of another preferred embodiment of a system for injecting catalyst and/or additives into an FCC unit, showing a dust collector and a transfer pot of the system longitudinal cross section.
Figure 12:
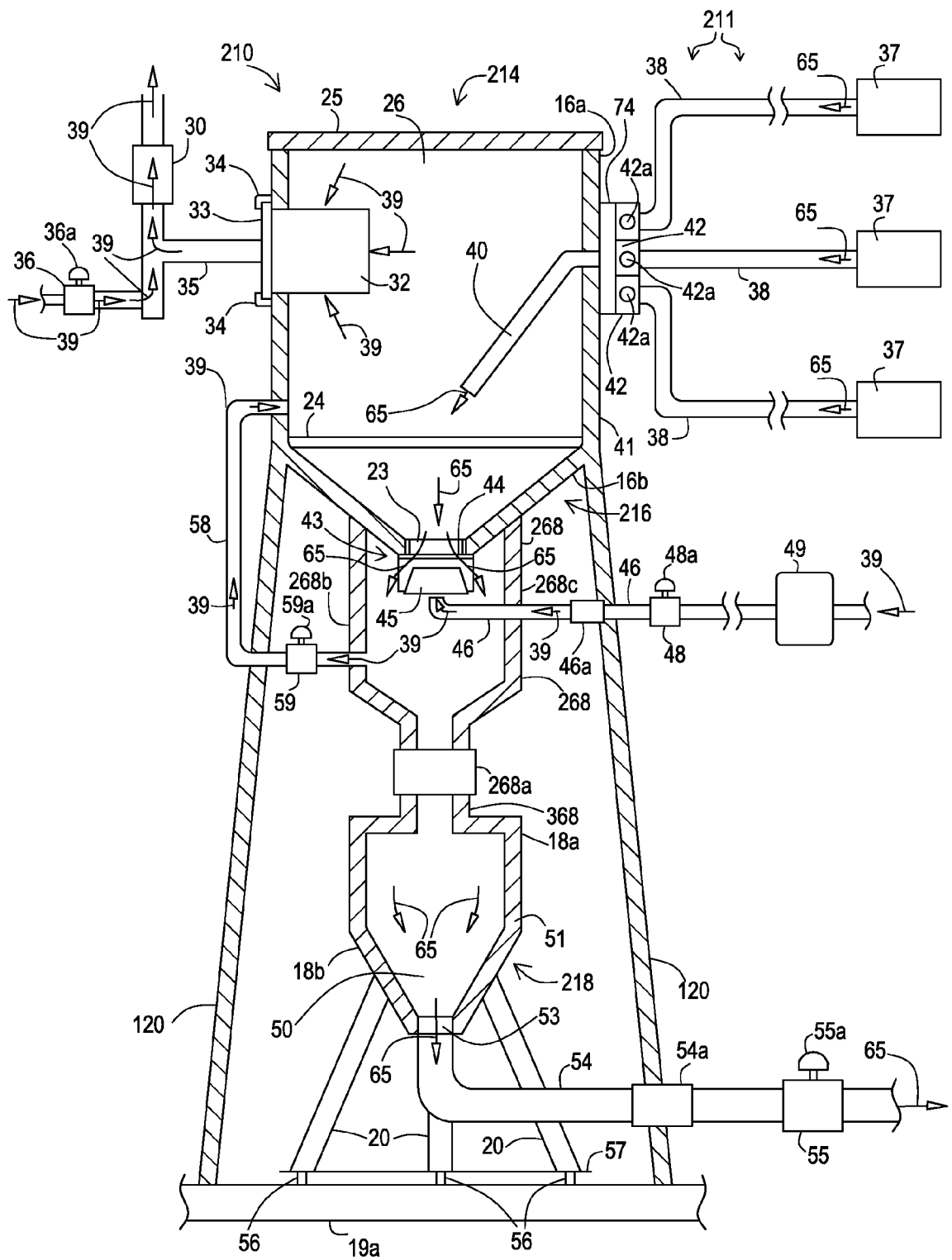
FIG. 12 is a schematic side view of yet another preferred embodiment of a system for injecting catalyst and/or additives into an FCC unit, showing a dust collector and a transfer pot of the system longitudinal cross section.
Figure 13:
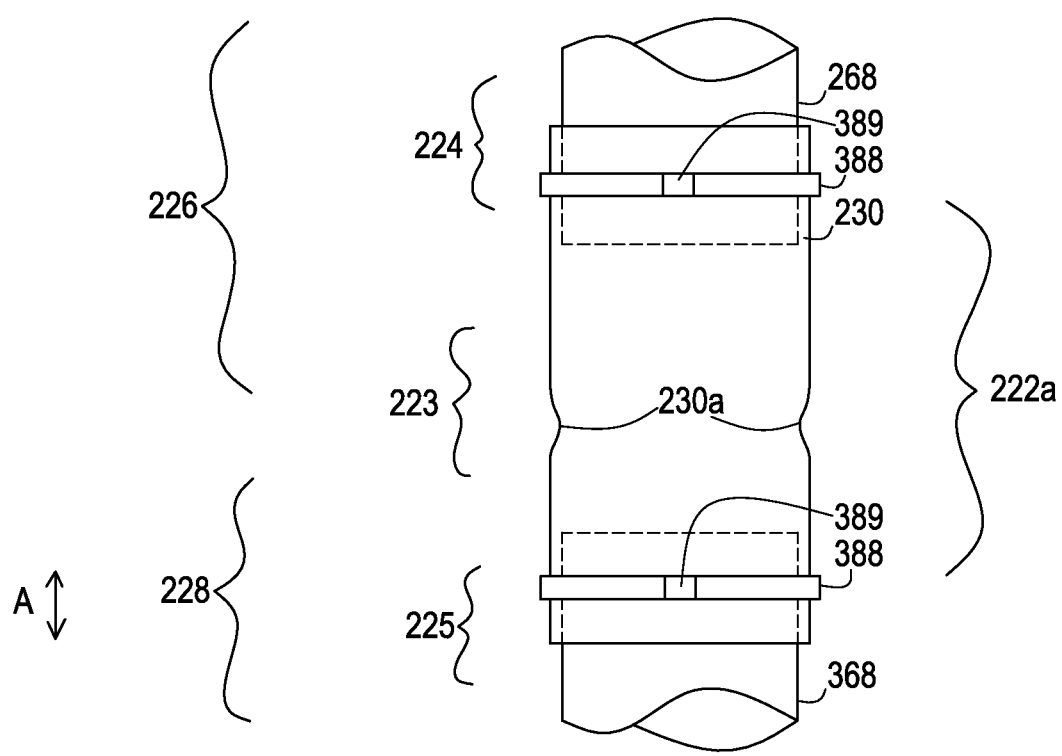
FIG. 13 is a cross-sectional view of an exemplary flexible section operatively adapted and sized to be positioned between and connect the exemplary dust collector and the exemplary transfer pot shown in FIGS. 11 and 12.

Further embodiments of the present invention, shown in FIGS. 11-13, are believed to further minimize one or more system variables that can potentially negatively impact a measured weight of the transfer pot and the one or more catalysts and/or additives contained therein as measured by the load cells 56. In these systems, at least one flexible section is positioned between and is in fluid communication with (i) the dust collector and (ii) the transfer pot so as to separate the dust collector from the transfer pot in such a manner so that the weight of the dust collector has little, if any, effect on a weight measurement of the transfer pot and its contents as measured by a plurality of load cells.

In particular, in the systems shown in FIGS. 11-12, the weight measurement of the transfer pot and its contents, as measured by a plurality of load cells, contains either (i) a minimal weight contribution provided by the dust collector or (ii) no weight contribution at all provided by the dust collector. As used herein, the phrase "a minimal weight contribution provided by the dust collector" refers to a weight contribution of the dust collector to the weight measurement (i.e., the weight measurement of the transfer pot and its contents as measured by the plurality of load cells) of greater than zero grams (g) and less than about 100 g (desirably, less than about 50 g, more desirably, less than about 25 g). As used herein, the phrase "no weight contribution provided by the dust collector" refers to a weight contribution of the dust collector to the weight measurement (i.e., the weight measurement of the transfer pot and its contents as measured by the plurality of load cells) equal to zero grams.

As shown in FIG. 11, overall system 110 comprises many of the components of overall system 11, as well as some additional system features. Overall system 110 comprises loading system 100, wherein the dust collector 160 and the transfer pot 180 are separated from one another by dust collector flange 168 forming an outlet for dust collector 160 and transfer pot flange 368 forming an inlet for transfer pot 180. Flexible section 168a bridges a space positioned therebetween dust collector flange 168 and transfer pot flange 368. Flexible section 168a substantially decouples the dust collector 160 from the transfer pot 180, thereby minimizing (i.e., desirably, completely eliminating) any tare weight contributed by the dust collector 160, the contents of the dust collector 160 (e.g., filter 32, pipe guides 40, particles that do not pass thru screen 24, etc.), and the components attached to the dust collector 160 (e.g., hoses 35 and 38, valves 42, dust collector flange 168, etc.) into the weight measurements of the plurality of load cells 56 (see FIG. 11).

As shown in FIG. 11, piping 58 may also comprise a flexible section 58a, which further decouples the dust collector 160 from the transfer pot 180, thereby further minimizing (i.e., desirably, completely eliminating) any tare weight contributed by the dust collector 160, the contents of the dust collector 160, and the components attached to the dust collector 160 into weight measurements of the plurality of load cells 56 (see FIG. 11).

Loading system 100 further comprises legs 120, which support the weight of the dust collector 160 above the transfer pot 180. In alternative embodiments (not shown), the weight of the dust collector 160 may be supported by wall structure of the cabinet 19 (see, the cabinet 19 in FIGS. 2-4).

Loading system 100 operates in a manner as described above in reference to loading system 10, except that load cells 56 only weigh the transfer pot 180, its contents (i.e., the catalyst and/or additive), and any components directly attached to the transfer pot 180 (i.e., a portion of piping 46, plug 45, transfer pot flange 368, a portion of piping 58, a portion of piping 54, valve 59, and legs 20 as shown in FIG. 11). In this embodiment, the plurality of load cells 56 do not weigh the dust collector 160, the contents of the dust collector 160 (e.g., filter 32, pipe guides 40, particles that do not pass thru screen 24), and the components attached to the dust collector 160. As discussed above, the weight measurement of the transfer pot 180 and its contents (i.e., the catalyst and/or additive), as measured by the plurality of load cells 56, contains either (i) a minimal weight contribution provided by the dust collector 160 (as well as the contents of the dust collector 160 (e.g., filter 32, pipe guides 40, particles that do not pass thru screen 24), and the components attached to the dust collector 160) or (ii) no weight contribution at all provided by the dust collector 160 (as well as the contents of the dust collector 160 (e.g., filter 32, pipe guides 40, particles that do not pass thru screen 24), and the components attached to the dust collector 160).

As shown in FIG. 11, piping 46 extends into a sidewall 51 of the transfer pot 180 so as to supply air pressure onto plug 45 to enable (1) closing/sealing of the transfer pot 180 at seat 144, and (2) pressurizing of the transfer pot 180 for transfer of one or more catalysts and/or additives from the transfer pot 180 to the fluidized catalytic cracking unit (not shown) via piping 54. FIG. 11 also depicts piping 58 extending out of a sidewall 51 of the transfer pot 180 so as to provide an air exit for (1) depressurizing the transfer pot 180, and (2) equalizing the pressure between the transfer pot 180 and the dust collector 160.

Although not shown in FIG. 11, transfer pot 180 may further comprise one or more additional components. In one exemplary embodiment (not shown), transfer pot 180 may further comprise (i) a lid component with transfer pot flange 368 separately fastened, or integrally connected, to and extending above, through and below the lid component, (ii) an internal flange portion extending below the lid component and into transfer pot 180 (i.e., in parallel alignment with transfer pot flange 368, and desirably, integrally connected with transfer pot flange 368 so as to form an extension of transfer pot flange 368 below the lid component), and (iii) an internal upper wall within transfer pot 180, wherein a pressurized volume within transfer pot 180 is bound by (1) one or more vertically-extending side walls and (2) the internal upper wall within transfer pot 180. In one configuration, the internal upper wall has a concave cross section as it projects into the transfer pot, e.g., to impart optimal pressurization properties. In this embodiment, the internal upper wall within transfer pot 180 has an opening therethrough for housing/supporting a distal flange end of the internal flange portion extending below the lid component and into transfer pot 180 a desired distance above plug 45 shown in FIG. 11. The internal flange may further comprise a flange end configuration and/or component (e.g., a rubber "O" ring) that provides a plug seat for plug 45 (i.e., the flange end has dimensions and a shape, and optionally an "O" ring, that matches the dimensions and shape of plug 45 so as to provide a seal).

As shown in FIG. 11, the dust collector 160 includes three pipe guides 40, wherein each pipe guide 40 is in fluid communication with an associated one of the hoses 38, similar to loading system 10 shown in FIG. 1. Catalyst and/or additive is drawn into the internal volume 26 of dust collector 216 by way of one of the pipe guides 40, and is discharged proximate screen 24 as shown in FIG. 11. Similar to loading system 10 shown in FIG. 1, alternative manifold and guide pipes illustrated in FIGS. 8-10 may be used within loading system 110 shown in FIG. 11.

FIG. 12 depicts another exemplary loading system of the present invention. As shown in FIG. 12, overall system 211 comprises similar components as described within overall system 110. Similar to overall system 110, overall system 211 comprises loading system 210, wherein the dust collector 216 and the transfer pot 218 are separated from one another by dust collector flange 268 forming an outlet for dust collector 216 and transfer pot flange 368 forming an inlet into transfer pot 218. Flexible section 268a bridges a space positioned therebetween dust collector flange 268 and transfer pot flange 368. Flexible section 268a substantially decouples the dust collector 216 from the transfer pot 218, thereby minimizing (i.e., desirably, completely eliminating) any tare weight contributed by the dust collector 216, contents of the dust collector 216 (e.g., filter 32, pipe guide 40, particles that do not pass thru screen 24, etc.), components attached to the dust collector 216 (e.g., hoses 35 and 38, valves 42, manifold 74, dust collector flange 268, portions of piping 46 and 58, etc.) and components attached to or contained within dust collector flange 268 (e.g., portion of hoses 46 and 58, and plug 45) into weight measurements of the load cells 56 (see FIG. 12) (or results in a minimal weight contribution of the dust collector 216 into any weight measurement of the plurality of load cells 56 as discussed above).

As shown in FIG. 12, the transfer pot 218 does not have any piping entering or exiting the transfer pot 218 other than inlet transfer pot flange 368 and outlet piping 54. In this embodiment, piping 46 extends into a side wall 268c of dust collector flange 268 extending from dust collector 216 so as to supply air pressure onto plug 45, also positioned within dust collector flange 268, to enable (1) closing/sealing of the dust collector 216 at seat 44, and (2) pressurizing of the transfer pot 218 for transfer of one or more catalysts and/or additives from the transfer pot 218 to the fluidized catalytic cracking unit (not shown) via outlet piping 54. As shown in FIG. 12, piping 58 extends out of a side wall 268b of dust collector flange 268 so as to provide an air exit for (1) depressurizing the transfer pot 218, and (2) equalizing the pressure between the transfer pot 218 and the dust collector 216.

As shown in FIG. 12, the flexible section 268a is subject to pressure during pressurization of the transfer pot 218. Consequently, the material used to form flexible section 268a, and connections thereto are constructed so as to withstand pressures used within transfer pot 218 for transfer of one or more catalysts and/or additives from the transfer pot 218 to the fluidized catalytic cracking unit (not shown) via outlet piping 54.

As shown in FIG. 12, the dust collector 216 utilizes a manifold 74 and single pipe guide 40 as described above with reference to FIG. 8. In this exemplary embodiment, single pipe guide 40 is in fluid communication with multiple hoses 38 via manifold 74, wherein each hose 38 is in fluid communication with a corresponding storage bin 37. Catalyst and/or additive is drawn into the internal volume 26 of dust collector 216 by way of pipe guide 40, and is discharged proximate screen 24 as shown in FIG. 12. Similar to loading system 10 shown in FIG. 1 and loading system 110 shown in FIG. 11, alternative manifold and guide pipes illustrated in FIGS. 9-11 may be used within loading system 211 shown in FIG. 12.

As with loading system 100, loading system 210 further comprises legs 120, which support the weight of the dust collector 216 above the transfer pot 218. As discussed above, in alternative embodiments (not shown), the weight of the dust collector 216 may be supported by wall structure of the cabinet 19 (see, the cabinet 19 in FIGS. 2-4).

Loading system 210 operates in a manner as described above in reference to loading system 10 and loading system 100, except that the plurality of load cells 56 only weigh the transfer pot 218, its contents (i.e., the catalyst and/or additive), and a minimum number of components attached to the transfer pot 218 (i.e., a portion of piping 54, transfer pot flange 368, and legs 20 as shown in FIG. 12). In this embodiment, the plurality of load cells 56 do not weigh the dust collector 160, the contents of the dust collector 160 (e.g., filter 32, pipe guides 40, particles that do not pass thru screen 24), components attached to the dust collector 160 (e.g., hoses 35 and 38, valves 42, manifold 74, dust collector flange 268, portions of piping 46 and 58, etc.) and components attached to or contained within dust collector flange 268 (e.g., portion of hoses 46 and 58, and plug 45).

As noted above, flexible sections, such as flexible sections 46a, 54a, 58a, 168a and 268a, enable components positioned away from the load cells 56 relative to a given flexible section (e.g., components such as valve 48 and moisture trap 49 in loading system 10; components such as valve 48, moisture trap 49 and dust collector 160 in loading system 100; and components such as dust collector flange 268 and dust collector 216 in loading system 210) to contribute a negligible amount, if any, to the weight readings of the plurality of load cells 56. It should be noted that each flexible section may comprise any material and have any configuration that (1) enables components positioned away from the plurality of load cells 56 relative to a given flexible section to contribute a negligible amount, if any, to the weight readings of the plurality of load cells 56, and (2) withstands any pressure exerted on a given flexible section within a given loading system.

One exemplary vertically-extending flexible section that may be used, for example, as flexible section 58a, 168a and/or 268a, is shown in FIG. 13. As shown in FIG. 13, exemplary vertically-extending flexible section 222a connects (i) dust collector flange 268 and one or more components 224 positioned above flexible section 222a and dust collector flange 268 to (ii) transfer pot flange 368 and one or more components 225 positioned below flexible section 222a. For example, in loading system 210, the one or more components 224 positioned above flexible section 222a (namely, above dust collector flange 268 and flexible section 268a shown in FIG. 12) include dust collector 216, piping 58, piping 46, and all other components positioned above piping 58 and piping 46 as shown in FIG. 12, while the one or more components 225 positioned below transfer pot flange 368 and flexible section 222a (namely, below transfer pot flange 368 and flexible section 268a shown in FIG. 12) include the transfer pot 218, legs 20 and a portion of piping 54 exiting transfer pot 218 as shown in FIG. 12.

As shown in FIG. 13, exemplary vertically-extending flexible section 222a comprises an expandable section 223 comprising overlapping portions 230a, 230b and 230c of side wall 230 having a crease/indentation 230a therein. As a lower portion of flexible section 222a and components 225, collectively designated 228, move up or down in direction A, an upper portion of flexible section 222a and components 224, collectively designated 226, remain stationary. At the same time, as a lower portion of flexible section 222a and components 225, collectively designated 228, move up or down in direction A, expandable section 230a either slightly expands (i.e., during downward movement) or slightly contracts (i.e., during upward movement).

Although expandable section 223 of exemplary vertically-extending flexible section 222a is shown as a crease/indentation 230a, it should be understood that any configuration may be used within flexible section 222a as long as flexible section 222a the configuration (1) enables the transfer pot and its contents to be weighed with little or no weight contribution from the dust collector as discussed above, and (2) withstands the pressure exerted on the loading system during operation.

As shown in FIG. 13, exemplary vertically-extending flexible section 222a may be attached to ends of (i) dust collector flange 268 and (ii) transfer pot flange 368 via exemplary clamping members 388 (e.g., a metal band having screw threads therein) and exemplary tightening members 389 (e.g., a screw). It should be understood that flexible sections disclosed herein (e.g., exemplary vertically-extending flexible section 222a) may be attached to ends of (i) dust collector flange 268 and (ii) transfer pot flange 368 via any type of connector (e.g., chemicals (e.g., adhesives), mechanical connectors such as shown in FIG. 13, and electrical/magnetic connectors) as long as the connection withstands any pressure exerted thereon.

Suitable materials for forming any of the above-described flexible sections include, but are not limited to, an elastomeric material, rubber, nylon, etc. In one exemplary embodiment, flexible sections, such as flexible section 168a and 268a comprise a vinyl sleeve with or without sleeve reinforcement (e.g., a fiber-reinforced vinyl sleeve).

As discussed above, the systems of the present invention enable efficient injection of one or more catalysts and/or additives into a fluidized catalytic cracking unit. As described illustratively in FIGS. 11-13, the systems of the present invention may comprise one or more of the following components and/or component features:

a dust collector in fluid communication with at least one storage bin holding one or more catalysts and/or additives;

a vacuum producer in fluid communication with the dust collector so that the vacuum producer generates a vacuum within the dust collector that draws the one or more catalysts and/or additives into the dust collector;

a transfer pot in fluid communication with the dust collector for receiving the one or more catalysts and/or additives from the dust collector, the transfer pot being in fluid communication with the fluidized catalytic cracking unit;

a plurality of load cells for measuring the transfer pot and the one or more catalysts and/or additives positioned within the transfer pot, wherein the weight measured by the plurality of load cells contains either (i) a minimal weight contribution provided by the dust collector or (ii) no weight contribution provided by the dust collector;

a cabinet for housing the dust collector and the transfer pot;

one set of a plurality of legs, wherein only the transfer pot is mounted on the plurality of legs, and each of the legs is secured to a common plate, the plate is mounted on the plurality of load cells, and the plurality of load cells are optionally mounted on a base of the cabinet;

two separate sets of a plurality of legs, wherein a first set of a plurality of legs supports the dust collector and a second set of a plurality of legs supports the transfer pot, and each of the legs within the second set of legs is secured to a common plate, the plate is mounted on the plurality of load cells, and the plurality of load cells are optionally mounted on a base of the cabinet;

the dust collector and the transfer pot are separate and separatable from one another and each comprises separate respective sidewalls;

at least one flexible section positioned between and in fluid communication with the dust collector and the transfer pot;

at least one flexible section comprising a vertically-extending flexible section; and two vertically-extending flexible sections positioned between and in fluid communication with the dust collector and the transfer pot.

The present invention is also directed to processes such as processes for introducing one or more catalysts and/or additives into a fluidized catalytic cracking unit. The processes may comprise one or more process steps and/or process features:

storing at least one or more catalysts and/or additives at a first location;

generating a vacuum within a loading unit comprising a dust collector in fluid communication with and separatable from a transfer pot;

drawing the one or more catalysts and/or additives from one or more storage bins and into the dust collector of the loading unit in response to the vacuum;

determining a weight of the one or more catalysts and/or additives positioned in the transfer pot of the loading unit, wherein the determining step comprises weighing the transfer pot and the one or more catalysts and/or additives positioned in the transfer pot so as to obtain a transfer pot/contents weight, wherein the transfer pot/contents weight contains either (i) a minimal weight contribution provided by the dust collector or (ii) no weight contribution provided by the dust collector;

monitoring a weight of the one or more catalysts and/or additives drawn into the loading unit (i.e., the transfer pot) and stopping generation of the vacuum when the weight reaches a predetermined value;

pressurizing the transfer pot of the loading unit;

injecting the one or more catalysts and/or additives into the fluidized catalytic cracking unit in response to reaching a threshold pressure within the transfer pot of the loading unit.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may affect numerous modifications to the invention as described herein, and changes may be made without departing from the scope and spirit of the invention as defined by the appended claims.

Parts List

Loading systems 10, 100 and 210
Systems 11, 110 and 210 for storing and loading catalyst and/or additives
Loading units 14, 140 and 214
Dust collectors 16, 160 and 216
Upper portion 16a (of dust collector 16, 160 or 216)
Lower portion 16b (of dust collector 16, 160 or 216)
Sidewall 17 (of dust collector 16, 160 or 216)
Transfer pots 18, 180 and 218
Cabinet 19
Base 19a (of cabinet 19)
Legs 20 (on loading unit 14, 140 or 214)
Legs 120 (on loading unit 140 or 214)
Opening 23 (in lower portion 16b)
Screen 24
Cover 25
Internal volume 26 (within dust collector 16, 160 or 216)
Vacuum producer 30
Filter 32
Hatch 33 (in dust collector 16, 160 or 216)
Brackets 34
Hose 35
Valve 36
Actuator 36a (of valve 36)
Storage bins 37
Hoses 38
Arrows 39
Pipe guides 40
Valve 42
Actuator 42a (of valve 42)
Valve 43
Seats 44 and 144
Plug 45 (of valve 43)
Piping 46
Flexible section 46a (of piping 46)
Valve 48
Actuator 48a (of valve 48)
Volume chamber and moisture trap 49
Internal volume 50 (within transfer pot 18, 180 or 218)
Sidewall 51 (of transfer pot 18, 180 or 218)
Opening 53 (in lower portion 18a of transfer pot 18, 180 or 218)
Piping 54
Flexible section 54a (of piping 54)
Valve 55
Actuator 55a (of valve 55)
Load cells 56
Plate 57
Piping 58
Flexible section 58a (of piping 58)
Valve 59
Controller 60
Brackets 61
Jack assemblies 62
Shafts 62a (of jack assemblies 62)
Nuts 62b
Control panel 64 (of controller 60)
Arrows 65
First pressure transducer 68
Second pressure transducer 70
Third pressure transducer 72
Manifold 74
Manifold 100
Pipe guides 102
Discharge pipe guide 104
Pipe guides 110
Dust collector flange 168 and 268
Transfer pot flange 368
Flexible section 168a (connecting dust collector flange 168 to transfer pot flange 368)
Flexible section 268a (connecting dust collector flange 268 to transfer pot flange 368)
Flexible section 222a
Clamping members 388

Tightening members 389
One or more components 224 (positioned above flexible section 222a)
One or more components 225 (positioned below flexible section 222a)
Expandable section 223 (of flexible section 222a)
Side wall 230 (of flexible section 222a)
Indentations 230a (of flexible section 222a)
Lower portion of flexible section 222a and components 225, collectively designated 228
Upper portion of flexible section 222a and components 224, collectively designated 226
Direction A

What is claimed is:

1. A system for injecting catalyst and/or additives into a fluidized catalytic cracking unit, comprising:
a dust collector adapted to be in fluid communication with at least one storage bin holding one of the catalyst and/or additives;
a vacuum producer in fluid communication with the dust collector so that the vacuum producer generates a vacuum within the dust collector that draws the one of the catalyst and/or additives into the dust collector;
a transfer pot which is selectively in fluid communication with the dust collector for receiving the one of the catalyst and/or additives from the dust collector, the transfer pot adapted to be in fluid communication with the fluidized catalytic cracking unit and a source of pressurized air so that the one of the catalyst and/or additives can be transferred to the fluidized catalytic cracking unit in response to a pressure differential between the transfer pot and the fluidized catalytic cracking unit;
at least one flexible section positioned between and in fluid communication with said dust collector and said transfer pot;
a first valve for isolating said dust collector from said transfer pot, disposed between said dust collector and said transfer pot, such that when said valve is opened, said dust collector and said transfer pot are in fluid communication with each other and such that when said valve is closed, said dust collector and said transfer pot are not in fluid communication with each other; and
a controller electrically coupled to an actuator of said first valve and to an actuator of said vacuum producer for controlling operation of said first valve and said actuator of said vacuum producer,
wherein said controller is programmed such that said first valve is open while said vacuum producer generates said vacuum within the dust collector.

2. The system of claim 1, wherein each of said at least one flexible section comprises a vertically-extending flexible section.

3. The system of claim 2, wherein said system comprises a single flexible section positioned between and in fluid communication with said dust collector and said transfer pot.

4. The system of claim 1, wherein the source of pressurized air is connected to said transfer pot via piping that extends through a sidewall of said transfer pot.

5. The system of claim 1, wherein the source of pressurized air is connected to said transfer pot via piping that extends through a sidewall of piping positioned above said at least one flexible section.

6. The system of claim 1, further comprising a plurality of load cells for measuring a weight of the transfer pot, and the one of the catalyst and/or additives positioned within the transfer pot.

7. The system of claim 6, wherein the weight measured by said plurality of load cells contains either (i) a minimal weight contribution provided by said dust collector or (ii) no weight contribution provided by said dust collector.

8. The system of claim 1, wherein:
the dust collector comprises a substantially cylindrical upper portion and an adjoining, substantially conical lower portion; and
the transfer pot comprises a substantially cylindrical upper portion separated from the lower portion of the dust collector by said at least one flexible section, and a substantially conical lower portion adjoining the upper portion of the transfer pot.

9. The system of claim 8, wherein the lower portion of the dust collector has an opening formed therein for permitting the one of the catalyst and/or additives to flow from the dust collector to the transfer pot.

10. The system of claim 9, wherein the first valve has a plug movable between an upper and a lower position in response to impingement of the pressurized air thereon.

11. The system of claim 9, wherein the upper portion of the transfer pot has an opening formed therein for permitting the one of the catalyst and/or additives to flow into the transfer pot, the first valve being disposed in the transfer pot covering the opening in the upper portion of the transfer pot on a selective basis, the first valve having a plug movable between an upper and a lower position in response to impingement of the pressurized air thereon.

12. The system of claim 8, wherein the lower portion of the transfer pot has an opening formed therein for permitting the one of the catalyst and/or additives to flow from the transfer pot to the fluidized catalytic cracking unit.

13. The system of claim 6, where the vacuum producer is in fluid communication with the source of pressurized air, and the system further comprises:
a second valve for isolating the vacuum producer from the source of pressurized air on a selective basis;
a third valve for isolating the transfer pot from the source of pressurized air on a selective basis;
a fourth valve for isolating the transfer pot from the fluidized catalytic cracking unit on a selective basis; and
a fifth valve for isolating the dust collector from at least one storage bin on a selective basis;
wherein said controller is electrically coupled to the load cells and respective actuators of the second, third, fourth and fifth valves for controlling the operation of the second, third, fourth and fifth valves.

14. The system of claim 13, wherein the controller:
generates a first control input to cause the second valve to open;
generates a second and a third control input that cause the respective second and the fifth valves to close after a predetermined amount of the one of the catalyst and/or additives has been drawn into the dust collector;
generates a fourth control input that causes the third valve to open to pressurize the transfer pot;
generates a fifth control input that causes the third valve to close after a pressure differential between the transfer pot and a regenerator of the fluidized catalytic cracking unit reaches a predetermined value; and
generates a sixth control input that causes the fourth valve to open.

15. The system of claim 1, wherein the system further comprises at least two storage bins holding the one or more catalysts and/or additives, the dust collector adapted to be in fluid communication with said at least two one storage bins via valves.

16. A system for injecting one or more catalysts and/or additives into a fluidized catalytic cracking unit comprising:
- a dust collector adapted to be in fluid communication with at least one storage bin holding the one or more catalysts and/or additives;
- a transfer pot which is selectively in fluid communication with the dust collector for receiving the one or more catalysts and/or additives from the dust collector, the transfer pot adapted to be in fluid communication with the fluidized catalytic cracking unit and a source of pressurized air so that the one or more catalysts and/or additives can be transferred to the fluidized catalytic cracking unit in response to a pressure differential between the transfer pot and the fluidized catalytic cracking unit;
- at least one flexible section positioned between and in fluid communication with said dust collector and said transfer pot;
- a plurality of load cells operatively adapted and positioned to weigh the transfer pot and the one or more catalysts and/or additives;
- a vacuum producer in fluid communication with the dust collector so that the vacuum producer generates a vacuum within the dust collector that draws the one or more catalysts and/or additives into the dust collector;
- a first valve for isolating said dust collector from said transfer pot, disposed between said dust collector and said transfer pot, such that when said valve is opened, said dust collector and said transfer pot are in fluid communication with each other and such that when said valve is closed, said dust collector and said transfer pot are not in fluid communication with each other; and
- a controller electrically coupled to an actuator of said first valve and to an actuator of said vacuum producer for controlling operation of said first valve and said actuator of said vacuum producer,
- wherein said controller is programmed such that said first valve is open while said vacuum producer generates said vacuum within the dust collector, and
- wherein said at least one flexible section enables a weight reading of said plurality of load cells to contain either (i) a minimal weight contribution provided by said dust collector or (ii) no weight contribution provided by said dust collector.

17. The system of claim 16, wherein said dust collector comprises a plurality of legs so as to support said dust collector above said transfer pot.

18. The system of claim 16, wherein the system further comprises at least two storage bins holding the one or more catalysts and/or additives, the dust collector adapted to be in fluid communication with said at least two one storage bins via valves.

* * * * *